US011999187B2

United States Patent
Wilkinson et al.

(12) United States Patent
(10) Patent No.: US 11,999,187 B2
(45) Date of Patent: Jun. 4, 2024

(54) ENGRAVING MACHINE FOR ENGRAVING OFFBOARD AND ONBOARD ITEMS

(71) Applicant: THE HILLMAN GROUP, INC., Cincinnati, OH (US)

(72) Inventors: David Wilkinson, Scottsdale, AZ (US); Nalinikanth Garikapati, Tempe, AZ (US)

(73) Assignee: THE HILLMAN GROUP, INC., Cincinnati, OH (US)

( * ) Notice: Subject to any disclaimer, the term of this patent is extended or adjusted under 35 U.S.C. 154(b) by 910 days.

(21) Appl. No.: 16/992,590

(22) Filed: Aug. 13, 2020

(65) Prior Publication Data

US 2022/0048314 A1 Feb. 17, 2022

(51) Int. Cl.
*B44B 3/00* (2006.01)
*B44B 3/06* (2006.01)

(52) U.S. Cl.
CPC .............. *B44B 3/009* (2013.01); *B44B 3/065* (2013.01)

(58) Field of Classification Search
None
See application file for complete search history.

(56) References Cited

U.S. PATENT DOCUMENTS 5,569,003 A * 10/1996 Goldman ................ B44B 3/009 221/124
6,668,210 B1 * 12/2003 Kim ........................ G07F 17/26 221/6
6,976,315 B2 * 12/2005 Hoshiyama ............. B44B 3/065 33/18.1
7,126,082 B2 * 10/2006 Lundberg ............... B23K 26/10 219/121.68
8,050,796 B1 * 11/2011 Hagen ...................... G07F 17/26 221/6
8,424,216 B2 * 4/2013 Huss ........................ B44B 3/009 33/18.1
10,810,822 B2 * 10/2020 Hoersten ................. G07F 9/026
10,814,668 B2 * 10/2020 Jackson ............. G06Q 30/0621
10,853,873 B2 * 12/2020 Bowles .............. G06K 19/0776
11,462,868 B2 * 10/2022 Forutanpour .......... H01R 27/00
11,587,085 B2 * 2/2023 Wang ....................... G07F 9/009
11,670,128 B2 * 6/2023 Tomasi ................... G07F 11/44 700/232
2021/0053385 A1 * 2/2021 Huss ........................ B44B 3/065

FOREIGN PATENT DOCUMENTS

WO WO-2010048893 A1 * 5/2010 ............. G07F 17/26
WO WO-2011056345 A2 * 5/2011 ............. B44B 3/009

* cited by examiner

*Primary Examiner* — George B Bennett
(74) *Attorney, Agent, or Firm* — Polsinelli PC

(57) ABSTRACT

An engraving machine is disclosed. The engraving machine may have a housing and an engraver located within the housing. The engraving machine may have a slot disposed on the housing for receiving a cartridge including an offboard item to be engraved. The engraving machine may have an onboard storage configured to store a plurality of tags. The engraving machine may have a carrier for receiving the cartridge through the slot and for positioning the cartridge relative to the engraver. The engraving machine may have a pick mechanism for selectively retrieving a tag from the tags stored in the onboard storage and for positioning the tag relative to the engraver. The engraver may engrave the offboard item or the tag based on a user selection.

26 Claims, 13 Drawing Sheets

ENGRAVING MACHINE FOR ENGRAVING OFFBOARD AND ONBOARD ITEMS

TECHNICAL FIELD

The present disclosure relates generally to an engraving machine and more particularly to an engraving machine for engraving offboard and onboard items.

BACKGROUND

Retail locations often have one or more engraving machines. These machines look like vending machines and allow customers to engrave one or more items (e.g. pet tags, luggage tags, etc.) with a customized inscription or message. One type of engraving machine requires a user to insert an item for engraving into the engraving machine. This type of machine also allows the user to provide information regarding a desired inscription via an input device associated with the machine. The machine then engraves the desired inscription on the item and dispenses the engraved item once the user has paid for the engraving services. However, this type of engraving machine may inconvenience the user because the user must first obtain the item, perhaps from a location distant from the machine, and then take the item to the engraving machine to get the item engraved.

Another type of engraving machine stores various items for sale within the machine. A user can select an item from the items stored in the machine and provide information regarding a desired inscription. The machine then engraves the desired inscription on the selected item and dispenses the engraved item once the user has paid for the item. Conventional engraving machines, however, have a limited amount of storage and cannot store a very large number or variety of items for the user to choose from. Accommodating a larger number and/or variety of items may require increasing the machine size. However, retailers disfavor larger machines, which occupy too much of the retail floor space that the retailers may have earmarked for storage and display of other merchandise. Therefore, there exists a need for an engraving machine that allows a user to engrave an offboard item or an onboard item while providing a large selection and variety of onboard items to choose from without increasing a size of the engraving machine.

The engraving machine of the present disclosure solves one or more of the problems set forth above and/or other problems of the prior art.

SUMMARY

In one aspect, the present disclosure is directed to an engraving machine. The engraving machine may include a housing and an engraver located within the housing. The engraving machine may include a slot disposed on the housing. The slot may be configured to receive a cartridge including an offboard item to be engraved. The engraving machine may also include an onboard storage configured to store a plurality of tags. Further, the engraving machine may include a carrier configured to receive the cartridge through the slot and to position the cartridge relative to the engraver. The engraving machine may also include a pick mechanism configured to selectively retrieve a tag from the tags stored in the onboard storage and position the tag relative to the engraver. The engraver may engrave a selected one of the offboard item or the tag.

In another aspect, the present disclosure is directed to another engraving machine. The engraving machine may include a housing, an input device associated with the housing, and an engraver located within the housing. The engraving machine may also include a slot disposed on the housing. The slot may be configured to receive a cartridge including an offboard item to be engraved. Further, the engraving machine may include a carrier configured to receive the cartridge through the slot and to position the cartridge relative to the engraver. The engraving machine may also include an onboard storage configured to store a plurality of tags. The engraving machine may include a pick mechanism configured to selectively retrieve a tag from the tags stored in the onboard storage and to position the tag relative to the engraver, and a chute configured to dispense the tag. The engraving machine may also include a controller. The controller may be configured to receive, from the input device, a user selection of one of the offboard item or the tag for engraving. The controller may also be configured to selectively control one or more of the carrier, the pick mechanism, or the engraver to engrave one of the offboard item or the tag based on the user selection.

DETAILED DESCRIPTION

Figure 1:
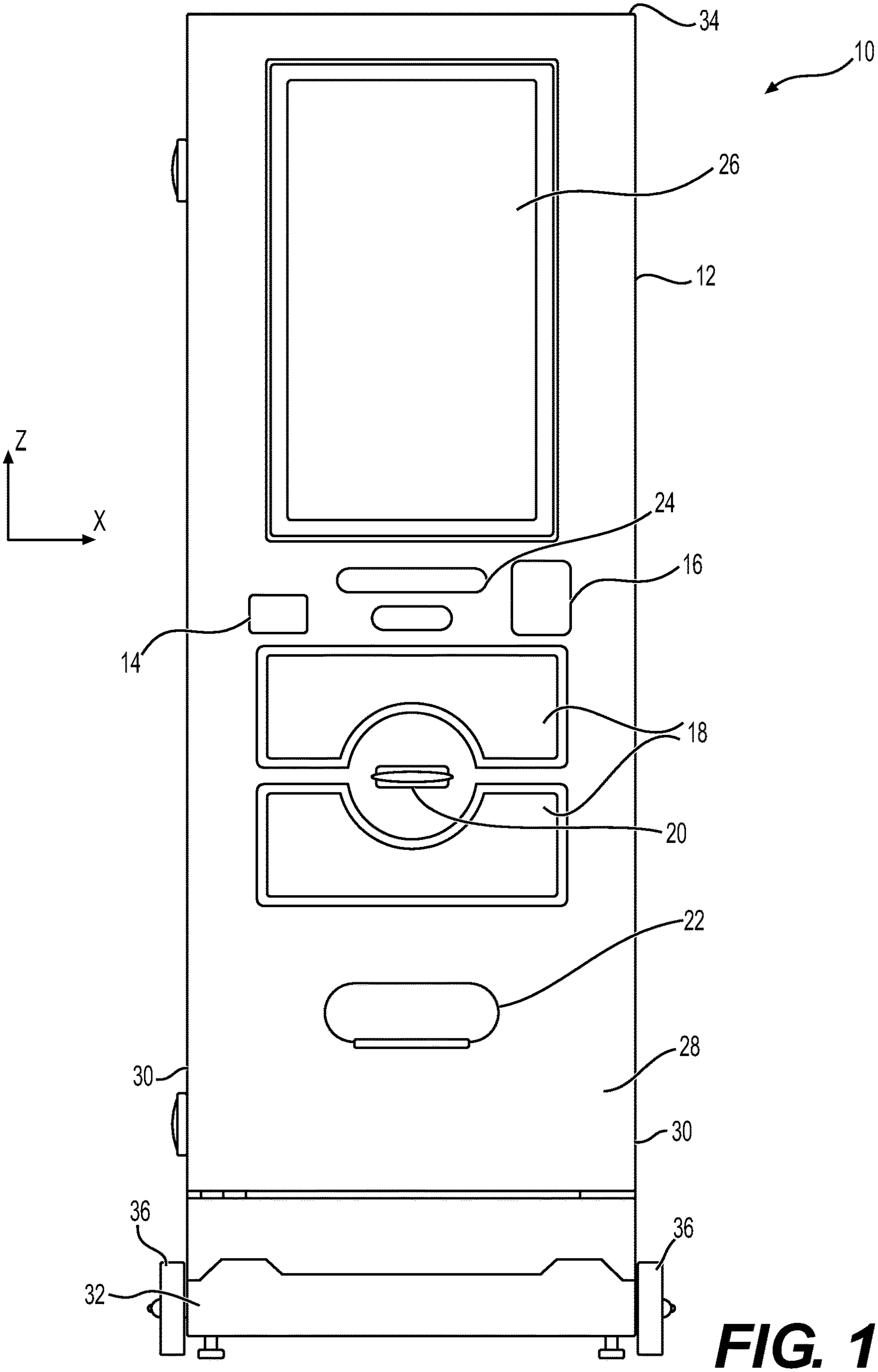
FIG. 1 is an illustration of an exemplary engraving machine.

FIG. 1 illustrates an exemplary engraving machine 10. In one exemplary embodiment as illustrated in FIG. 1, engraving machine 10 may be a kiosk, having a size and shape similar to, for example, a telephone booth, an ATM machine, or a vending machine usually available at commercial or retail locations such as at grocery or hardware stores, shopping malls, or airports. Engraving machine 10 may be configured to engrave an item (not shown), which may be an offboard item 42 (see FIG. 3) or an onboard item 140 (see FIG. 7). Offboard item 42 may be an item that a user provides to engraving machine 10 for engraving a custom inscription. For example, offboard item 42 may be an item belonging to the user or an item that the user may purchase from a retail location housing engraving machine 10 or from another retail location. Onboard item 140 may be an item stored within engraving machine 10. Engraving machine 10 may be configured to allow a user to purchase onboard item 140 from engraving machine 10. Further, the user may be able to use engraving machine 10 to engrave onboard item 140 with a desired inscription. For purposes of this disclosure, each of the terms "item," "offboard item," and "onboard item" is intended to include any product or good that is or may be sold with a personalized inscription. Examples of such items may include, but are not limited to, id tags (e.g. pet id tags, luggage id tags, name plates, etc.), key chains, tourism mementos, holiday gifts, tournament plaques, etc.

Engraving machine 10 may include housing 12, cash acceptor 14, payment capture device 16, viewing windows 18, slot 20, dispensing bin 22, input device 24, and display 26. Housing 12 of may be in the form of an enclosure, which may include door 28, one or more side panels 30, base 32, and ceiling 34. Door 28 may be mounted on hinges located on an outer edge of side panel 30. Door 28 may also include alignment features (e.g. pins or projections) that may engage with one or more corresponding features (e.g. recesses, notches, etc.) on side panel 30 when door 28 is closed. Door 28, side panels 30, base 32, and ceiling 34 may form a generally cuboidal housing 12, although other shapes of housing 12 are also contemplated. Housing 12 may include one or more wheels 36 that may allow engraving machine 10 to be relocated to a different location, for example, for carrying out maintenance or repairs.

Cash acceptor 14 may be located on door 28. Cash acceptor 14 may be configured to receive currency in the form of bills or coins as payment from a customer. Cash bin 38 (see FIG. 2) may be associated with cash acceptor 14 and may be configured to receive bills and/or coins and dispense change in the form of bills or coins through cash acceptor 14. Payment capture device 16 may be located on door 28 on an opposite side from cash acceptor 14. Payment capture device 16 may be a credit card or debit card reader. In some exemplary embodiments, payment capture device 16 may be configured to accept other types of payment such as checks or other forms of electronic payment. In some exemplary embodiments, payment capture device 16 may be configured to receive payment via wireless communication with another electronic device, for example, a mobile phone, a tablet computer, a laptop computer, a remote server, etc. The relative locations of cash acceptor 14 and payment capture device 16 on housing 12 as illustrated in FIG. 1 are exemplary, and it is contemplated that cash acceptor 14 and/or payment capture device on 16 may be positioned anywhere on engraving machine 10. It is also contemplated that in some exemplary embodiments, payment capture device 16 may be configured to receive and/or dispense currency in the form of bills and/or coins obviating the need for a separate cash acceptor 14. Although FIG. 1 illustrates housing 12 as including a single cash acceptor 14 and a single payment capture device 16, it is contemplated that housing 12 may include more than payment capture device 16, each of which may be capable of receiving a particular type of payment. The one more viewing windows 18 may allow a customer to view an interior of engraving machine 10. Viewing windows 18 may include transparent glass or other materials (e.g. plexiglass).

Figure 3:
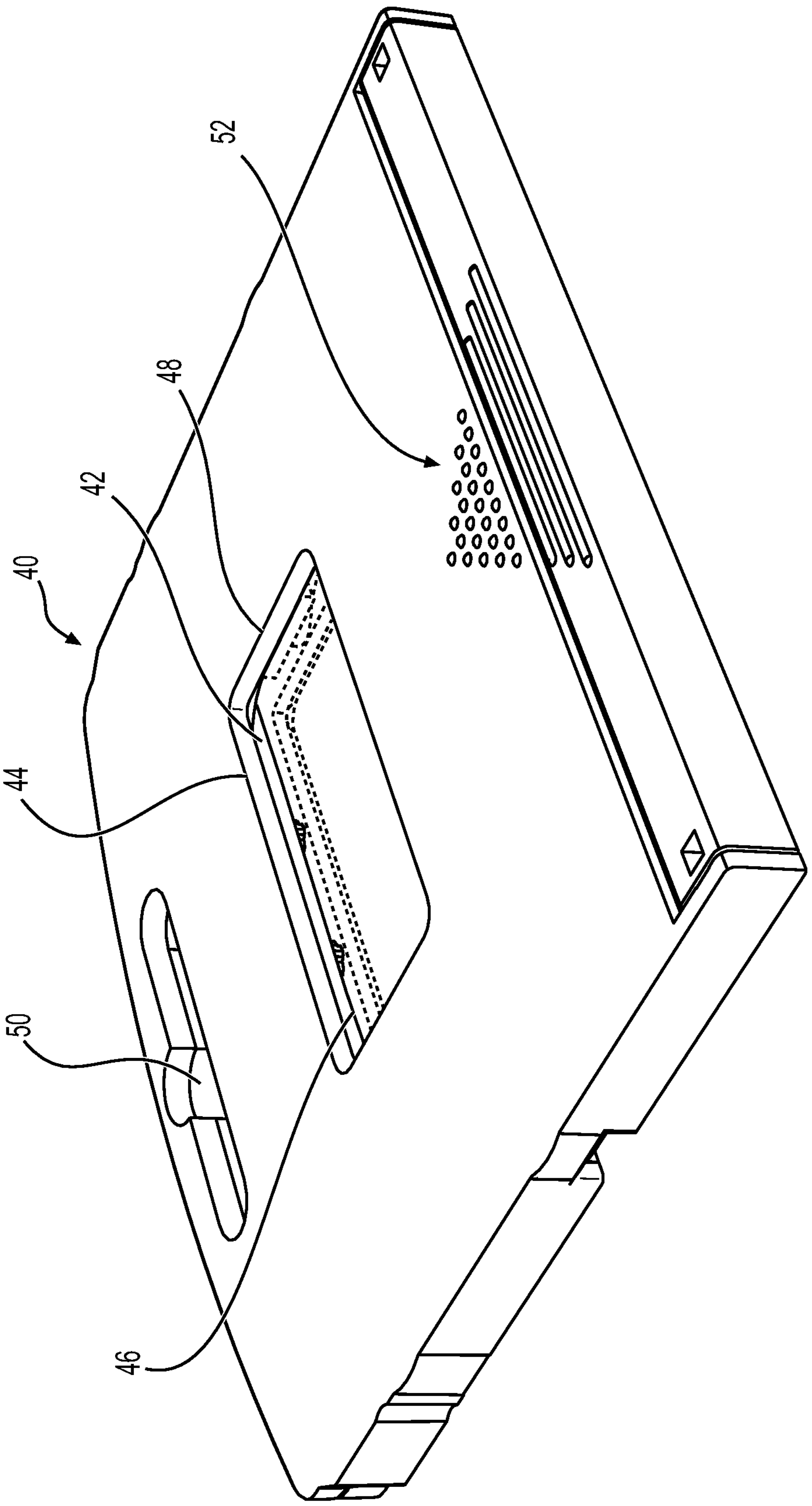
FIG. 3 is an illustration of an exemplary cartridge including an offboard item that may be engraved by the engraving machine of FIG. 1.

Slot 20 may be configured to allow a user to insert cartridge 40 (see FIG. 3) into engraving machine 10. After engraving operations, cartridge 40 may be dispensed to the user through slot 20. In one exemplary embodiment as illustrated in FIG. 3, cartridge 40 may include upper portion 44 and lower portion 46 that may be removably attached to each other. Upper portion 44 and lower portion 46 may enclose offboard item 42, which may be sandwiched between upper and lower portions 44, 46. Cartridge 40 may also include windows 48 in upper and lower portions 44, 46. A portion of offboard item 42 may be exposed for engraving through windows 48. In one exemplary embodiment as illustrated in FIG. 3, window 48 may have a rectangular shape, although other shapes for window 48 are also contemplated. Cartridge 40 may include opening 50 disposed on one side of window 48 and indicia 52 disposed on an opposite side of window 48. Opening 50 may be configured to receive a hanger or hook (not shown) or other structural member that may allow cartridge 40 to be attached to a rack (not shown) in a retail store. Indicia 52 may include, for example, an arrow indicating a direction in which cartridge 40 should be inserted into slot 20 of engraving machine 10. Indicia may be embossed or engraved on upper portion 44 and/or lower portion 46. Additionally or alternatively, indicia 52 may be painted on upper portion 44 and/or lower portion 46 in a contrasting color to improve visibility of indicia 52. Although only one type of indicia 52 have been illustrated in FIG. 3, it is contemplated that cartridge 40 may include any number of indicia 52 providing instructions for orienting cartridge 40 for insertion into slot 20. Although cartridge 40 has been describe above as including offboard item 42 for engraving, it is contemplated that in some exemplary embodiments, a user may be able to insert offboard item 42, for engraving, directly into slot 20 without using cartridge 40. It is also contemplated that cartridge 40 may have shapes and/or features different from or in addition to those discussed above.

Returning to FIG. 1, engraving machine 10 may include dispensing bin 22 associated with housing 12. In one exemplary embodiment, after engraving, machine 10 may dispense the engraved offboard item 42 or onboard item 140 to the user via dispensing bin 22. It is also contemplated that in some exemplary embodiments, dispensing bin 22 may be equipped with a cover or door (not shown) that may prevent access to dispensing bin 22 during the engraving process and that may retract only after the engraved offboard item 42 or onboard item 140 has been dispensed to dispensing bin 22.

Engraving machine 10 may include one or more input devices 24 located on housing 12. The one or more input devices 24 may include one or more physical keyboards, mice, joysticks, buttons, touch pads, etc. In some exemplary embodiments, the one or more input devices 24 may be ADA (Americans With Disabilities Act) compliant devices. It is also contemplated that in some exemplary embodiments, input devices 24 may be configured to receive a speech input or braille input from a user.

Display 26 may be positioned on door 28 of housing 12. It is contemplated, however, that display 26 may be positioned anywhere on housing 12 (e.g. on side panel 30). Display 26 may include a conventional display device, for example, an LCD screen, an LED screen, a cathode ray tube screen, etc. In some exemplary embodiments, display 26 may be configured to display a graphical user interface, including instructions, advertising, and/or other information. In some exemplary embodiments, display 26 may additionally or alternatively include a touch screen device configured to receive one or more inputs from a user. Thus, for example, a graphical user interface displayed on display 26 may allow a user to select one or more onboard items 140 stored within housing 12 for purchase, specify text for a desired inscription, accept or reject a displayed price, and/or request help on using engraving machine 10. In some exemplary embodiments, display 26 may be configured to display a virtual keyboard or numeric keypad, which may allow a user to enter payment information, address information, inscription information, and/or other information associated with engraving an offboard item 42 or onboard item 140 using engraving machine 10.

Figure 2:
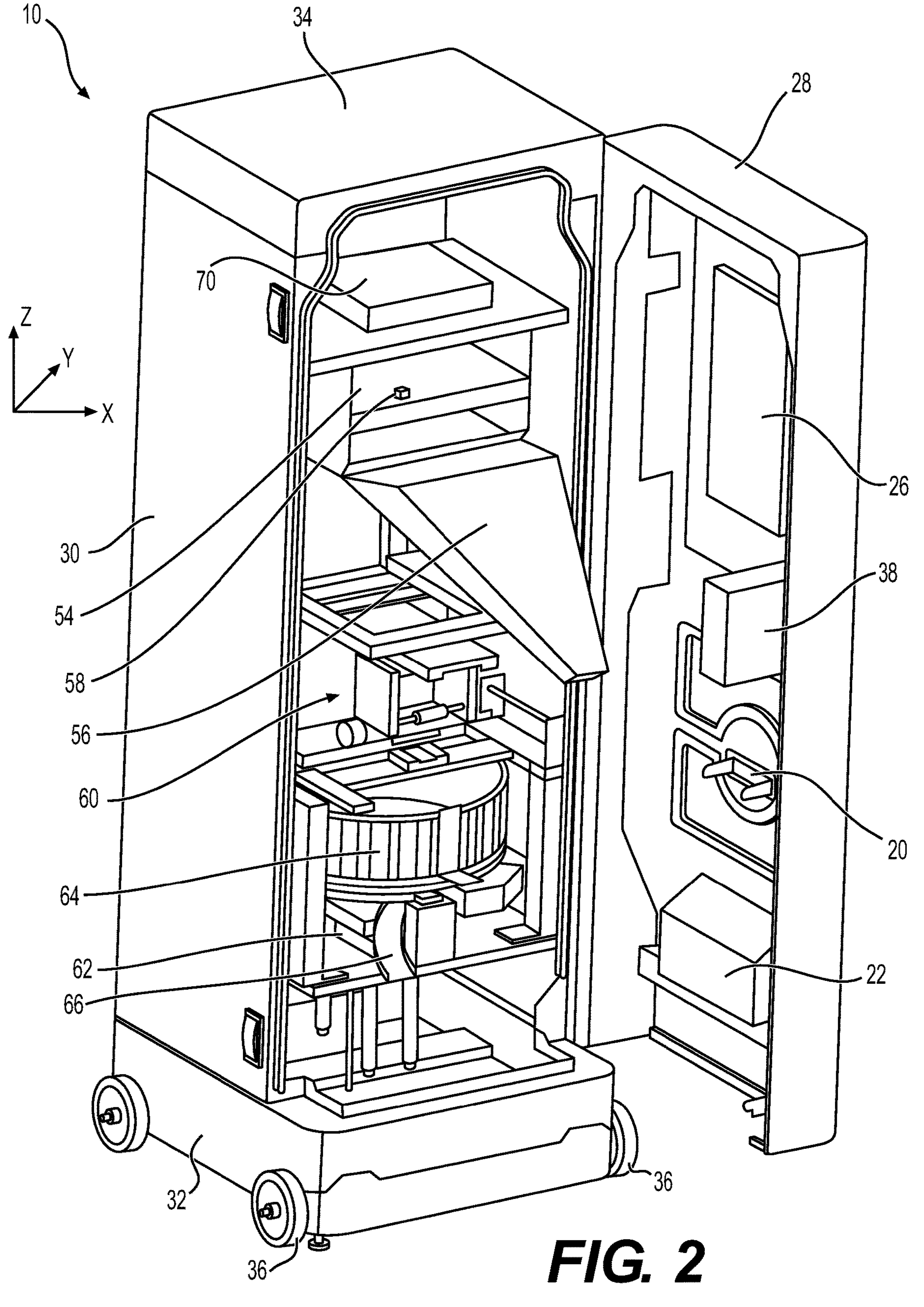
FIG. 2 is another illustration of the engraving machine of FIG. 1.

FIG. 2 illustrates another view of engraving machine 10 with door 28 opened. As illustrated in FIG. 2, engraving machine 10 may include accessory storage 54, accessory chute 56, engraving mechanism 60, pick mechanism 62, onboard storage 64, dispensing chute 66, and controller 70. Accessory storage 54 may be configured to store one or more accessories 58 that a user may purchase from engraving machine 10. For example, display 26 may display one or more of accessories 58 stored in accessory storage 54. A user may be able to select and purchase one or more accessories 58 by using the one or more input devices 24 or touchscreen display 26. As used in this disclosure, the term "accessory" is intended to include any product or good that is or may be sold for use with offboard item 42 and/or onboard item 140. Examples of accessories 58 may include, but are not limited to, split rings, packaging materials (pouches, bags, etc.), decorative materials (e.g. stickers), etc. Engraving machine 10 may be configured to allow a user to purchase one or more accessories 58 either in conjunction with or separate from a purchase of onboard item 140. The one or more accessories 58 selected by the user may be dispensed into dispensing bin 22 via accessory chute 56.

Engraving mechanism 60 may be configured to engrave offboard item 42 or onboard item 140 with an inscription. For example, a user may be able to specify a desired inscription for engraving on one or both sides of offboard item 42 or onboard item 140 using the one or more input devices 24 or touchscreen display 26. Pick mechanism 62 may be configured to selectively retrieve onboard item 140 from onboard storage 64 and position onboard item 140 relative to engraving mechanism 60 to allow onboard item 140 to be engraved. The engraved onboard item 140 may be dispensed into dispensing bin 22 via dispensing chute 66. In one exemplary embodiment as illustrated in FIG. 2, accessory storage 54 may be positioned adjacent ceiling 34 of housing 12, onboard storage 64 may be positioned adjacent base 32 of housing 12, and engraving mechanism 60 may be positioned between accessory storage 54 and onboard storage 64. Pick mechanism 62 may be configured to move in a generally vertical direction (e.g. in a Z-direction) between a position adjacent to onboard storage 64 and a position adjacent to engraving mechanism 60. It will be understood that the relative positions of accessory storage 54, engraving mechanism 60, pick mechanism 62, and onboard storage 64 within housing 12 as described above are exemplary and these components may be arranged generally horizontally or generally vertically relative to each other in other configurations. Engraving mechanism 60, pick mechanism 62, and onboard storage 64 will be described in more detail below. As used in this disclosure, the terms "about" and "generally" should be interpreted to encompass typical design and manufacturing tolerances. Thus, for example, the phrase "generally perpendicular" or "generally vertical" should be interpreted as encompassing angles that may lie within 90°±5°. Similarly, for example, the phrase "generally horizontal" should be interpreted as encompassing angles that may lie within 0°±5°.

Controller 70 may be configured to control operations of various components (e.g. cash acceptor 14, payment capture device 16, input device 24, display 26, accessory storage 54, engraving mechanism 60, pick mechanism 62, onboard storage 64, etc.) of engraving machine 10. Controller 70 may include one or more processors and/or one or more memory devices. Controller 70 may also be configured to receive and/or send signals to one or more of cash acceptor 14, payment capture device 16, input device 24, display 26, door 28, accessory storage 54, engraving mechanism 60, pick mechanism 62, onboard storage 64, and/or one or more sensors, actuators, and/or locks associated with engraving machine 10. Controller 70 may also be configured to send or receive signals to an offboard processor and/or server or to one or more other engraving machines 10. Controller 70 may be configured to receive and/or send signals through one or more wired connections or wirelessly.

The processor of controller 70 may embody a single microprocessor or multiple microprocessors, digital signal processors (DSPs), etc. Numerous commercially available microprocessors may be configured to perform the processor functions. Various other known circuits may be associated with the processor, including power supply circuitry, signal-conditioning circuitry, and communication circuitry. The one or more memory devices associated with controller 70 may store, for example, data and/or one or more control routines or instructions for processing the one or more signals, and/or to control operations of one or more components of engraving machine 10. The one or more memory devices may embody non-transitory computer-readable media, for example, Random Access Memory (RAM) devices, NOR or NAND flash memory devices, and Read Only Memory (ROM) devices, CD-ROMs, hard disks, floppy drives, optical media, solid state storage media, etc. Controller 70 may receive one or more input signals from one or more of display 26 or other input devices 24 associated with engraving machine 10 and may execute the routines or instructions stored in the one or more memory devices to generate and deliver one or more command signals to one or more components of engraving machine 10.

Figure 4:
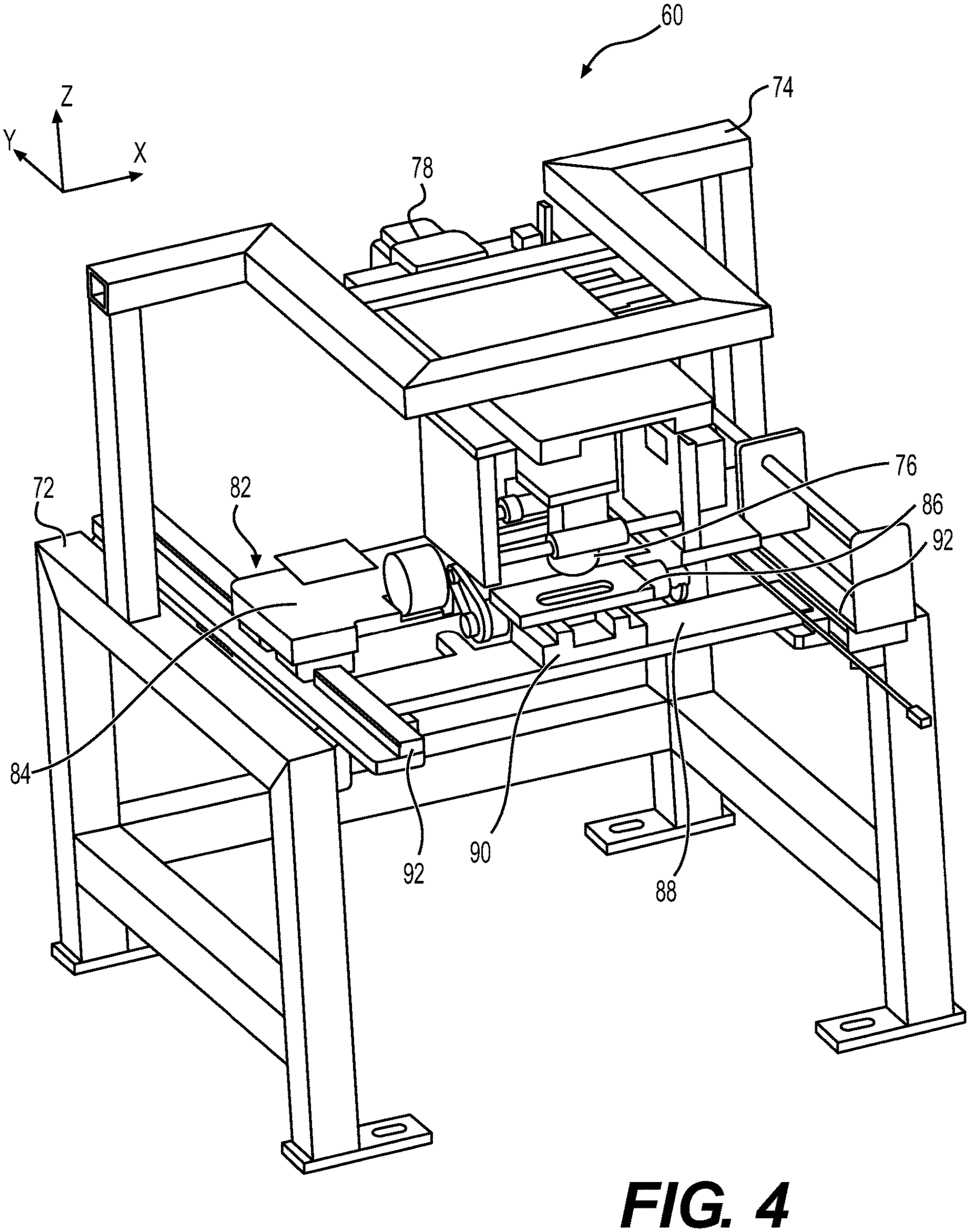
FIG. 4 is an illustration of an exemplary engraver assembly of the engraving machine of FIG. 1.

FIG. 4 illustrates a magnified view of a portion of engraving mechanism 60. Engraving mechanism 60 may include frame 72, support structure 74, engraver 76, and carrier assembly 82. Engraver 76 may be mounted to support structure 74 that may provide for movement of engraver 76 in at least three directions. In one exemplary embodiment, engraver 76 may be configured to move in the X-direction (e.g. along a width of housing 12), the Y-direction (e.g. front to back along a depth of housing 12), and the Z-direction (e.g. vertical along a height of housing 12). In another exemplary embodiment as illustrated in FIG. 4, these three directions (e.g. X-, Y-, and Z-directions) may be generally perpendicular to each other. Engraving mechanism 60 may include one or more actuators 78 that may control movement of engraver 76 in the X-, Y-, and Z-directions. Engraver 76 may be a scribe engraver. It is contemplated, however, that engraver 76 may be a milling engraver, a laser engraver, or any other type of engraver.

Figure 5A:
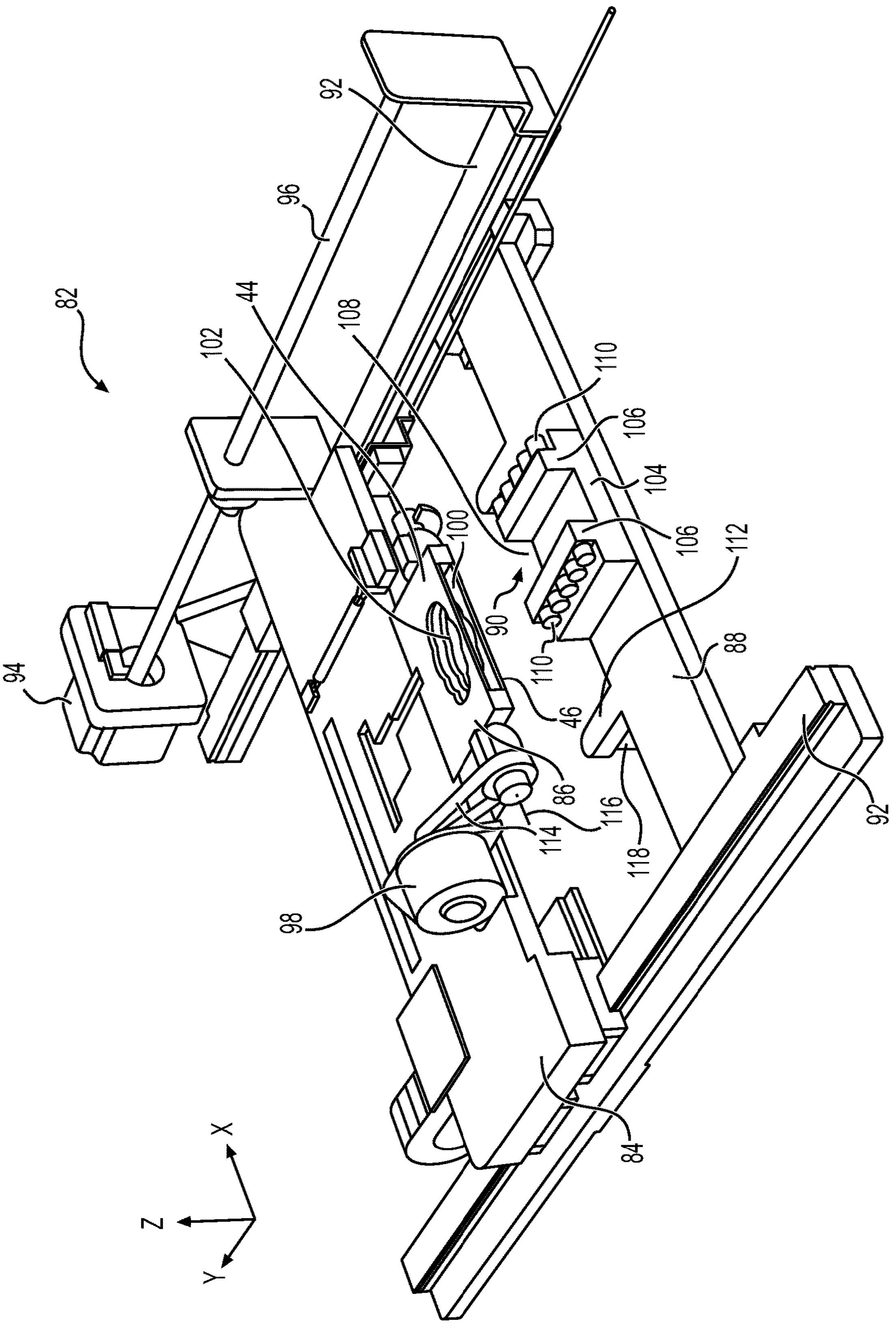
FIG. 5A is an illustration of portions of an exemplary carrier assembly of the engraving machine of FIG. 1.

Carrier assembly 82 may be attached to frame 72 and may include table 84, carrier 86, plate 88, carrier block 90, and guiding members 92. FIG. 5A illustrates a magnified view of a portion of carrier assembly 82. As illustrated in FIG. 5A, carrier assembly 82 may also include, actuator 94, lead screw 96, and actuator 98. In one exemplary embodiment as illustrated in FIG. 5A, table 84 may be in the form of a movable plate. Table 84 may be movable in a first direction (e.g. +Y or −Y direction) toward or away from slot 20. Table 84 may be configured to slidingly move over guiding members 92 toward or away from slot 20. For example, actuator 94 may be operatively connected to table 84 via lead screw 96 and may be configured to move table 84 in the first direction. Carrier 86 may be attached to table 84 and may also be movable in the first direction toward or away from slot 20. Carrier 86 may include slot 100 and windows 102. Carrier 86 may receive cartridge 40 through slot 100. Windows 102 in carrier 86 may be configured to align with windows 48 in cartridge 40, exposing opposite sides of offboard item 42 for engraving.

Figure 5B:
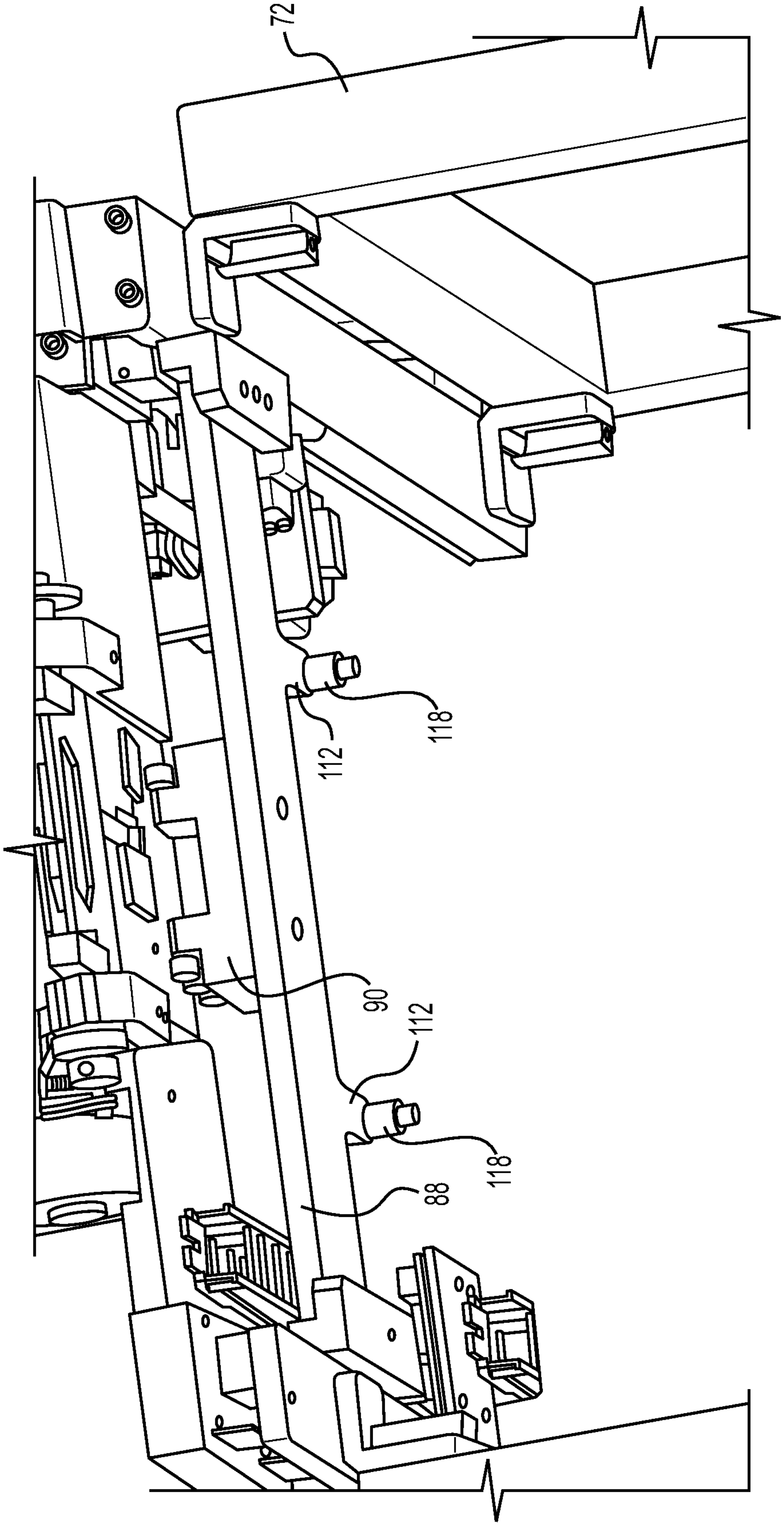
FIG. 5B is another illustration of portions of the exemplary carrier assembly of FIG. 5A.

Plate 88 may be fixedly connected to guiding members 92. Plate 88 may include a pair of projections 112 disposed spaced apart from each other along a width direction (e.g. X-direction) of housing 12. Projections 112 may project from plate 88 toward table 84. Each projection 112 may include at least one docking pin 118 extending downward (e.g. −Z direction) from projection 112. FIG. 5B illustrates another magnified view of a portion of carrier assembly 82, showing docking pins 118. Docking pin 118 may be fixedly or removably attached to projection 112. As illustrated in the exemplary embodiment of FIG. 5B, docking pin 118 may have a generally cylindrical shape with a tapered end, although other shapes (e.g. cuboidal, polygonal, elliptical, pyramid etc.) are also contemplated. Docking pin 118 may be configured to engage with mating receptacles 236 (see FIG. 6) associated with pick mechanism 62. Although only two projections have been illustrated in FIGS. 5A and 5B, it is contemplated that plate 88 may include any number of projections. Similarly, although each projection 112 has been illustrated as including only one docking pin 118, it is contemplated that each projection 112 may include any number of docking pins 118.

Returning to FIG. 5A, carrier block 90 may be attached to plate 88. Carrier block 90 may include base 104, projections 106, and rollers 110. Base 104 of carrier block 90 may be fixedly attached to plate 88. Projections 106 may extend generally vertically upward from base 104 and away from plate 88. Projections 106 may be spaced apart from each other along a width direction (e.g. X-direction) of engraving machine 10, forming recess 108, which may be defined by base 104 and projections 106 on three sides and may be open opposite base 104. Rollers 110 may extend outward on either side from projections 106 in a direction away from recess 108. Table 84 may be configured to position carrier 86 over rollers 110 such that windows 102 in carrier 86 may be positioned over recess 108. Thus, a position of carrier 86 over rollers 110 with windows 102 positioned over recess 108 may be an engraving position in which engraver 76 may be configures to engrave an upper surface (e.g. pointing in the +Z direction) of offboard item 42.

Carrier 86 may also be flipped over such that, for example, a lower surface (e.g. initially pointing in the −Z direction) of offboard item 42 may be exposed to engraver 76 for engraving purposes. Specifically, carrier 86 may be operatively connected to actuator 98. In one exemplary embodiment as illustrated in FIG. 5A, actuator 98 may be connected to carrier 86 by way of belt 114. Actuator 98 may cause carrier 86 to rotate about axis 116 by about 180°, flipping carrier 86 such that windows 102 on lower portion 46 of carrier 86 may expose a lower surface of offboard item 42 for engraving.

Figure 6:
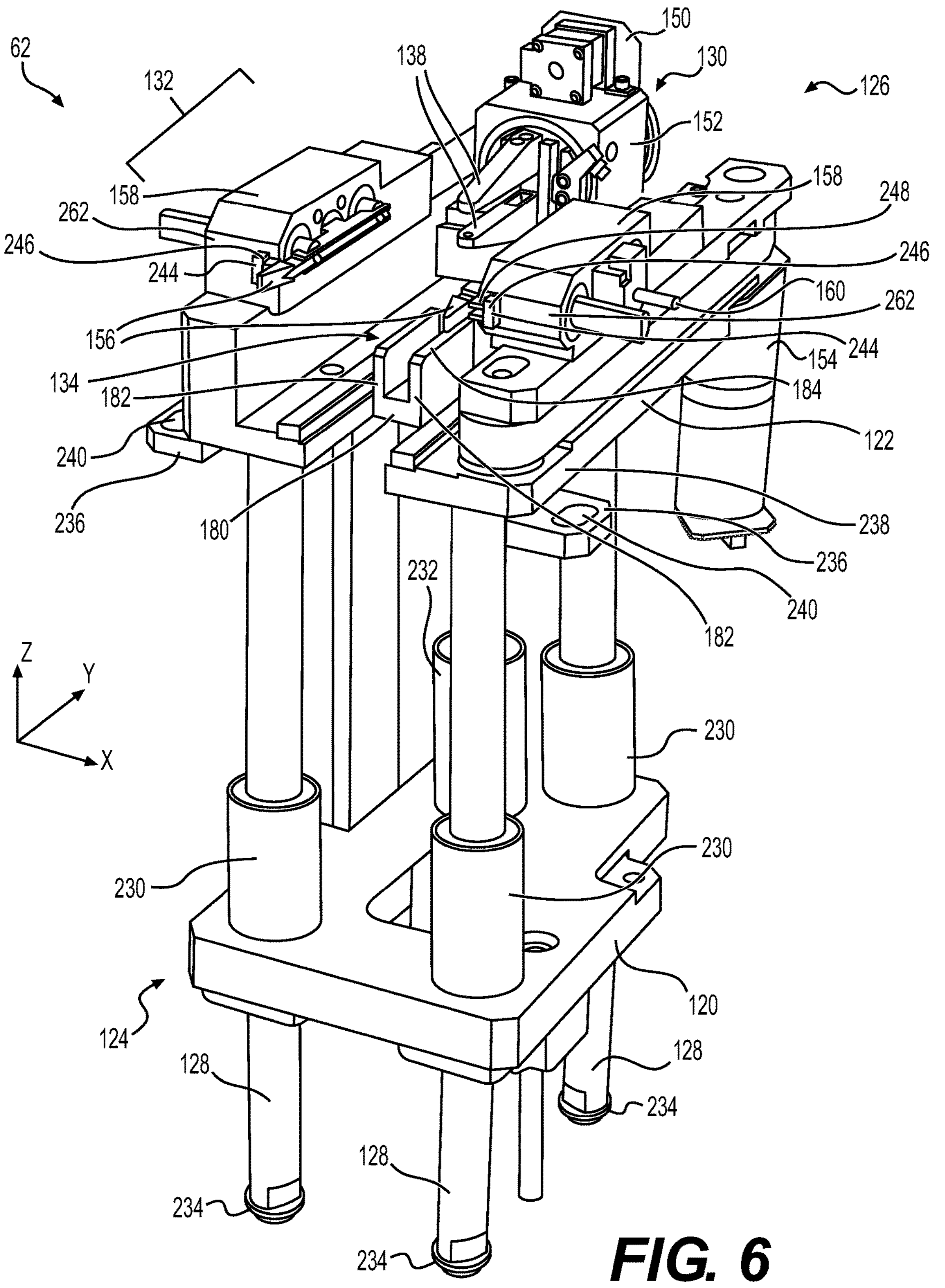
FIG. 6 is an illustration of an exemplary pick mechanism of the engraving machine of FIG. 1.

FIG. 6 illustrates an exemplary pick mechanism 62. Pick mechanism 62 may include fixed platform 120, movable platform 122, guide posts 128, gripper assembly 130, horizontal clamp 132, and anvil 134. Fixed platform 120 may be connected to frame 72 and/or housing 12. Movable platform 122 may be positioned spaced apart from fixed platform 120 and may be movable in a second direction (e.g. +Z- or −Z-direction) relative to fixed platform 120. In one exemplary embodiment as illustrated in FIGS. 5 and 6, the second direction (e.g. Z-direction) may be generally perpendicular to the first direction (e.g. Y-direction). Fixed platform 120 and movable platform 122 may extend in a depth direction of housing 12 (e.g. Y-direction) from adjacent front end 124 to adjacent rear end 126. Guide posts 128 may extend from movable platform 122 and may slidingly pass through openings (not shown) in fixed platform 120. In one exemplary embodiment as illustrated in FIG. 6, a pair of guide posts 128 may be disposed adjacent front end 124 and another guide post 128 may be disposed adjacent rear end 126. It is contemplated, however, that pick mechanism 62 may include more than or less than three guide posts 128. Bushing guides 230 may be attached to fixed platform 120. Each bushing guide 230 may protrude upward from fixed platform 120 towards movable platform 122. Bushing guide 230 may have a generally annular shape with an opening that aligns with the opening in fixed platform 120. Guide posts 128 may be journaled within bushing guides 230 allowing guide posts 128 to slidingly pass through bushing guides 230. Although bushing guides 230 have been illustrated in FIG. 6 as having annular cylindrical shapes, other shapes of bushing guides 230 are also contemplated.

One or more actuators (not shown) may be attached to movable platform 122. Operation of the one or more actuators may allow movable platform 122 to move in a generally vertical direction (e.g. Z-direction) away from fixed platform 120. Movable platform 122 may be configured to move pick mechanism 62 between a position adjacent to onboard storage 64 and a position adjacent to engraver 76. Movable platform 122 may include receptacles 236 disposed adjacent to front end 124 of movable platform 122. Receptacles 236 may be fixedly or removably attached to movable platform 122. Each receptacle 236 may project laterally outward from side surface 238 of movable platform 122. For example, as illustrated in FIG. 6, first receptacle 236 may project outward in a +X direction from adjacent side surface 238 of movable platform 122 and second receptacle 236 may project outward in a −X direction from adjacent side surface 238 of movable platform 122. Each receptacle 236 may include opening 240 configured to receive docking pin 118 of carrier assembly 82. Thus, movable platform 122 may travel upwards away from fixed platform 120 towards engraver 76 until openings 240 may engage with and receive docking pins 118 attached to plate 88 of carrier assembly 82. Engagement of the docking pins 118 with receptacles 236 in this manner may help stabilize pick mechanism 62 and prevent vibration of pick mechanism 62 and the associated onboard tag 140 during engraving of onboard tag 140. This in turn may help reduce inaccuracies in engraving of onboard tag 140.

As also illustrated in FIG. 6, hard stop 232 may be attached to fixed platform 120. Hard stop 232 may be disposed on fixed platform 120 between guide posts 128 and may project upward from fixed platform 120 toward movable platform 122. When movable platform 122 moves downward (e.g. −Z direction) toward fixed platform 120, movable platform 122 may come into contact with hard stop 232, which may prevent further downward travel of movable platform 122. In one exemplary embodiment as illustrated in FIG. 6, hard stop 232 may have a generally annular cylindrical shape, although other shapes of hard stop 232 are also contemplated. As further illustrated in FIG. 6, each guide post 128 may include hard stop 234 attached to an end of guide post 128. Hard stop 234 may include a washer that may have an outer dimension (e.g. diameter) larger than an outer dimension (e.g. diameter) of guide post 128 and larger than the dimensions of the openings in fixed platform 120. When movable platform 122 moves upwards (e.g. +Z direction) away from fixed platform 120, hard stops 234 may abut on a lower surface of fixed platform 120, preventing further upward movement of movable platform 122. Thus, hard stops 232 and 234 may define the maximum and minimum heights of movable platform 122 relative to fixed platform 120.

Figure 7:
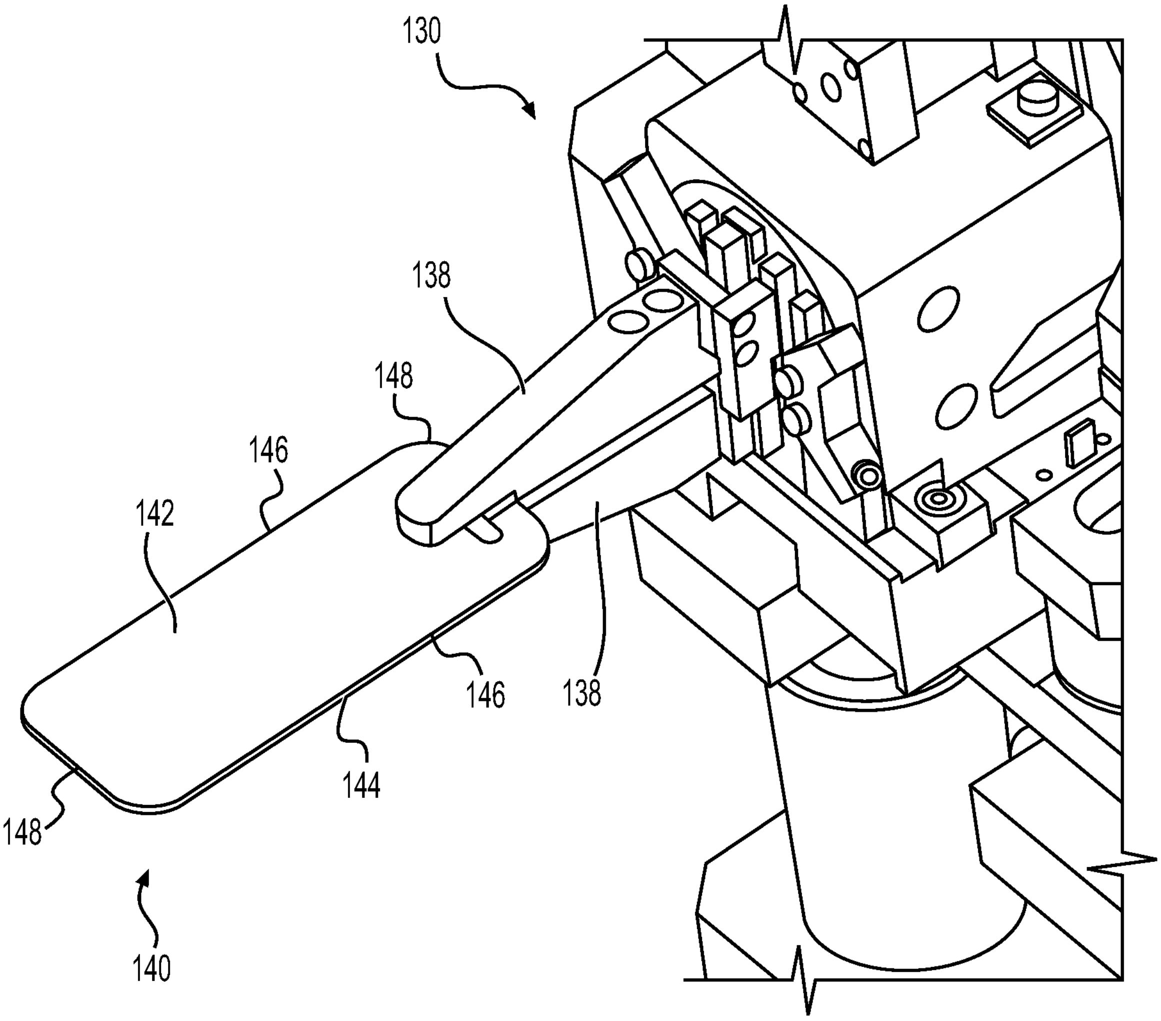
FIG. 7 is a magnified illustration of a portion of the exemplary pick mechanism of FIG. 6.

Gripper assembly 130 may be attached to movable platform 122 and may include gripper arms 138, which may be spaced apart from each other in an open position. Gripper arms 138 may be configured to move towards or away each other. As illustrated in FIG. 7, gripper arms 138 may be configured to sandwich or clamp onboard item 140 between gripper arms 138. In one exemplary embodiment as illustrated in FIG. 7, onboard item 140 may include a tag. Tag 140 may be generally plate-like having upper surface 142 and lower surface 144 disposed opposite upper surface 142 and separated by a thickness of tag 140. Upper and lower surfaces 142, 144 may be bounded by edges 146, 148. Although tag 140 has been illustrated in FIG. 7 as having a generally rectangular shape bounded by pairs of edges 146, 148, it is contemplated that tag 140 may have any shape (e.g. circular, square, polygonal, bone shaped, etc.) having any number of edges.

Returning to FIG. 6, gripper assembly 130 may include a actuators 150, 152, 154. Actuator 150 may be operatively connected to gripper arms 138 and may be configured to move gripper arms 138 toward or away from each other. For example, actuator 150 may be configured to move gripper arms 138 away from each other when gripper arms 138 are in their open position. Conversely, actuator 150 may be configured to move gripper arms 138 toward each other when gripper arms 138 are in their closed position in which gripper arms 138 may engage with upper and lower surfaces 142, 144 and clamp on to onboard item 140.

Actuator 152 may be operatively connected to gripper arms 138 and may be configured to rotate gripper arms 138 either in the clockwise or in the counterclockwise direction by about 180°. Thus, actuator 152 may be configured to rotate gripper arms 138 so that onboard item 140 grasped by gripper arms 138 may be flipped upside down, allowing both upper surface 142 (see FIG. 7) and lower surface 144 (see FIG. 7) to be engraved by engraver 76.

Actuator 154 may be operatively connected to gripper arms 138 and may be configured to move gripper arms 138 in the first direction (e.g. Y-direction) toward or away from anvil 134. Thus, for example, actuator 154 may be configured to move gripper arms 138 toward anvil 134 in a direction from adjacent rear end 126 toward front end 124 so that onboard item 140 may be positioned over anvil 134, allowing anvil 134 to support onboard item 140 during the engraving process. Similarly, for example, actuator 154 may be configured to move gripper arms 138 away from anvil 134 in a direction from adjacent front end 124 toward rear end 126 after engraving onboard item 140

Horizontal clamp 132 may include one or more jaws 156 and one or more actuators 158. Jaws 156 may be configured to move toward or away from each other in a third direction (e.g. X-direction), which may be generally perpendicular to both the first direction (e.g. Y-direction) and second direction (e.g. Z-direction). In their open position, jaws 156 may be disposed spaced apart from each other. Conversely in their closed position, jaws 156 may move toward each other to horizontally clamp onboard item 140 between jaws 156.

Figure 8:
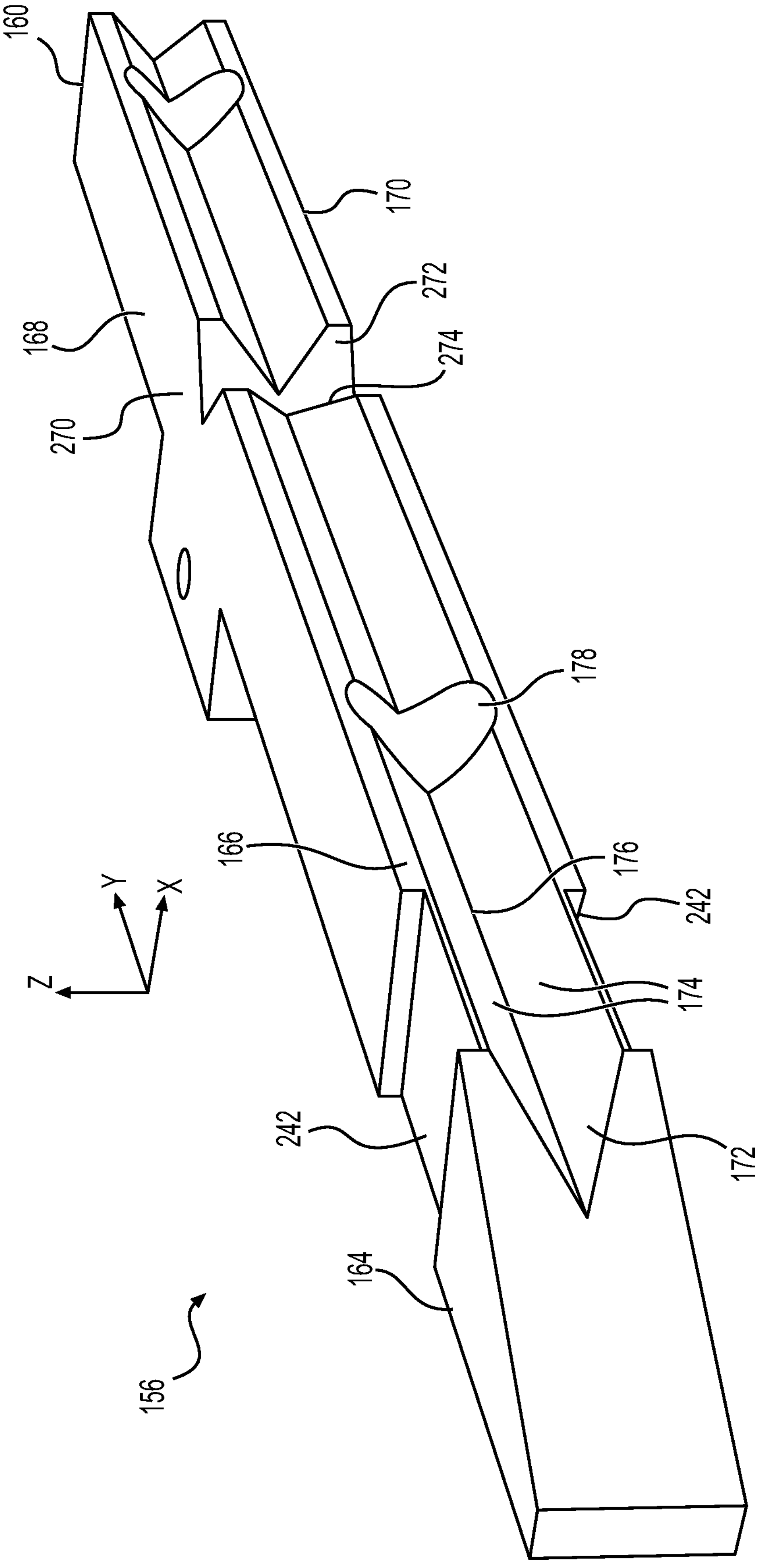
FIG. 8 is an illustration of an exemplary jaw of the pick mechanism of FIG. 6.

FIG. 8 illustrates an exemplary embodiment of jaw 156. As illustrated in FIG. 8, jaw 156 may include a generally elongated arm 162. In one exemplary embodiment, arm 162 may extend in the first direction (e.g. Y-direction). Arm 162 may include rear surface 164 that may face actuator 158 and front surface 166 disposed opposite rear surface 164. Arm 162 may also include an upper surface 168 and a lower surface 170 that may define a thickness of arm 162. Arm 162 may include groove 172 that may extend from front surface 166 toward the rear surface 164. In one exemplary embodiment as illustrated in FIG. 8, groove 172 may be a generally V-shaped groove that may be wider adjacent front surface 166 and may become narrower in a direction toward rear surface 164. Inner surfaces 174 and/or inner edge 176 may engage with one or more edges 146 or 148 of onboard item 140 to help clamp onboard item 140 between jaws 156.

Arm 162 may include hole 178 that may be threaded and may engage with lead screw 160. One of both jaws 156 of horizontal clamp 132 may include the V-shaped groove described above. As also illustrated in FIG. 8, each jaw 156 may include notches 242 on upper surface 168 and lower surface 170 of jaw 156. For example, jaw 156 may include notch 242 extending for a predetermined depth from upper surface 168 toward lower surface 170. Similarly, jaw 156 may include notch 242 extending for a predetermined depth from lower surface 170 toward upper surface 168. The predetermined depth of notches 242 may be smaller than half the thickness of jaws 156. In one exemplary embodiment as illustrated in FIG. 8, notches 242 may extend across a width of upper surface 168 and lower surface 170.

Jaw 156 may also include vertical notch 270 that may extend in a generally vertical direction (e.g. Z-direction) from lower surface 170 two upper surface 168. Vertical notch 270 may extend from front surface 166 of jaw 156 toward rear surface 164. In one exemplary embodiment as illustrated in FIG. 8, vertical notch 270 may be generally V-shaped that may be wider adjacent front surface 166 and may become narrower in a direction toward rear surface 164 (e.g. X-direction). The V-shaped vertical notch 270 may be defined by opposing angled faces 272 and 274. Vertical notch 270 may be configured to engage with, for example, protrusions and/or corners of onboard items 140 that may have an irregular (e.g. not rectangular or square) shape. For example, vertical notches 270 on a pair of jaws 156 may engage with the two tips of an onboard item 140 or tag 140 having a generally elongated elliptical shape of a football such that a longer axis of the football-shaped tag may be oriented in a direction generally parallel to the X-direction. Thus, for example, angled faces 272, 274 may engage with edges of irregularly shaped onboard items 140 to help orient and secure irregularly shaped onboard items 140 within jaws 156 for engraving.

Returning to FIG. 6, one or more actuators 158 may be disposed on movable platform 122. Actuators 158 may be disposed on movable platform 122 extending in a depth direction (e.g. Y-direction). Actuators 158 may include synchronous and opposed motors that may be configured to rotate lead screws 160. Rotation of lead screws 160 in one of a clockwise or a counterclockwise direction may cause jaws 156 to move toward or away from each other.

Actuators 158 may also include home switches 244 disposed on front surface 262 of actuator 158. Front surface 262 of actuator 158 may be oriented toward front end 124. Home switch 244 may include switch base 246 and legs 248 projecting from switch base 246 toward an opposite actuator 158 (e.g. in the +X or −X directions). Legs 248 may be spaced apart from each other and may be configured to engage with notches 242 and receive jaw 156 between legs 248 when jaw 156 is positioned adjacent to actuators 158. Legs 248 may be equipped with an optical sensor (e.g. transmitter/receiver pair). When jaw 156 is received between legs 248, jaw 156 may trip an optical beam extending between the transmitter/receiver pair of the optical sensor, indicating that jaw 156 has reached its home location. Controller 70 may receive a signal from the optical sensor when jaws 156 are in their home locations. Controller 70 may calibrate actuators 158 by zeroing out their positions upon receiving the signal from the optical sensor in home switches 244. It will be understood that when both jaws 156 are in their respective home locations, jaws 156 may be separated from each other by their maximum possible separation along a width of engraving machine 10 (e.g. in the X direction).

Pick mechanism 62 may include anvil 134 positioned generally below horizontal clamp 132. Anvil 134 may be positioned between jaws 156 and actuators 158. Anvil 134 may include anvil base 180 that may be fixedly attached to movable platform 122. Anvil 134 may also include legs 182 that may project upward from anvil base 180 toward horizontal clamp 132. Legs 182 may be spaced apart from each other and may have upper surfaces 184 that may engage with upper surface 142 or lower surface 144 of onboard item 140 to support onboard item 140 during engraving operations.

Figure 9:
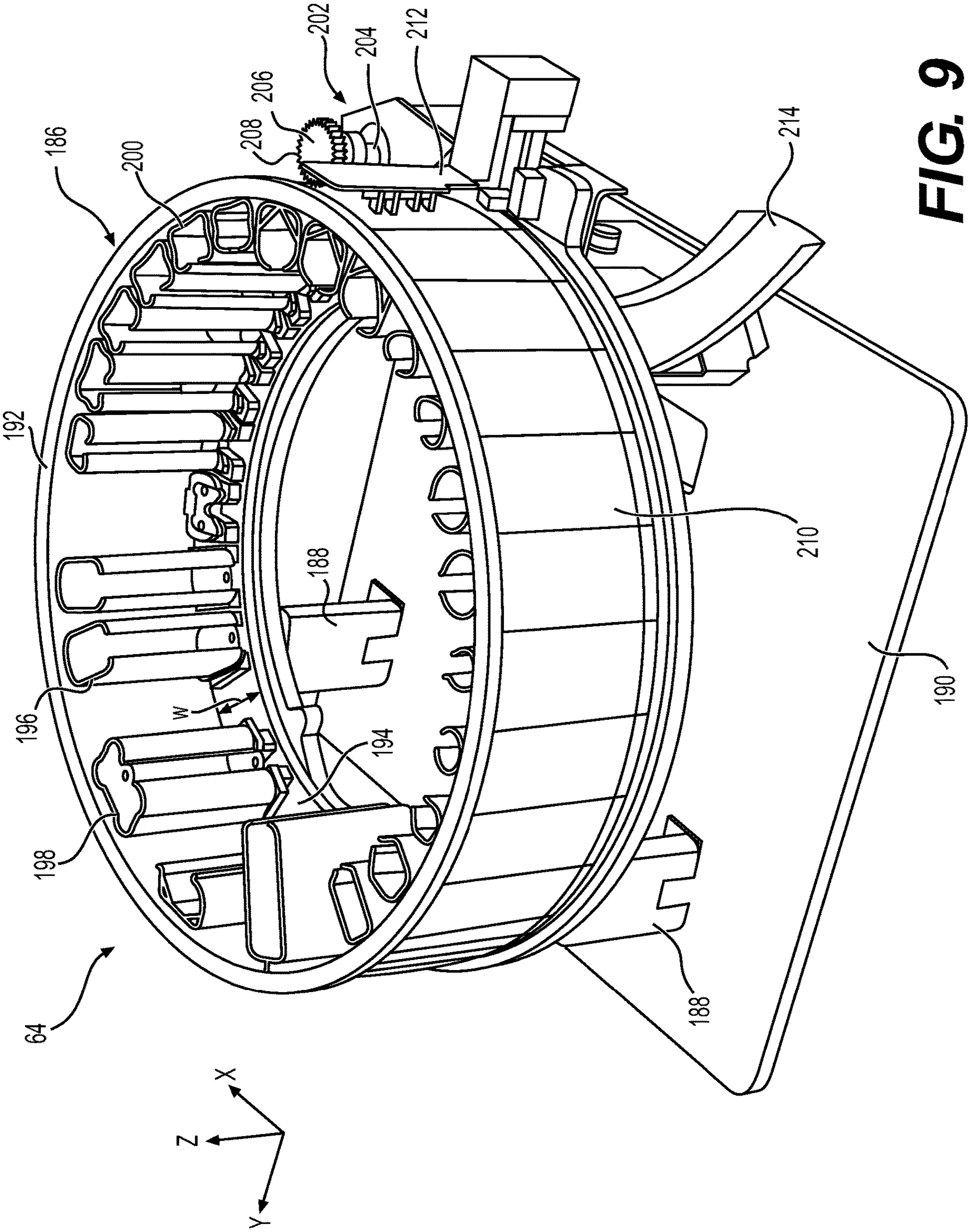
FIG. 9 is an illustration of an exemplary onboard storage of the engraving machine of FIG. 1.

FIG. 9 illustrates an exemplary embodiment of onboard storage 64. Onboard storage 64 may include a carousel 186 supported on legs 188 that may be connected to support plate 190, which may be connected to housing 12. Carousel 186 may include ring 192, shelf 194, one or more magazines 196, 198, 200, actuator 202, and item ejector 212. Ring 192 of carousel 186 may have a generally circular shape. Shelf 194 may extend radially inward from ring 192 toward a center of ring 192. Shelf 194 may have a predetermined radial width, for example, width W as illustrated in FIG. 9. Shelf 194 may be configured to support a plurality of magazines (e.g. 196, 198, 200) which may be arranged along a circumference of Ring 192. Each of magazines 196, 198, 200 may include a generally vertically extending C-shaped channel with an opening located facing a center of ring 192. Each of magazines 196, 198, 200 may be configured to store a stack of onboard items 140. Ring 192 may be rotatable about a generally vertical axis by way of, for example, actuator 202. Actuators 78, 94, 98, 150, 152, 154, 158, and/or 202 may include one or more stepper motors, pneumatic, hydraulic, or electric motors, rack and pinion arrangements, pulley or gear arrangements, rotary encoders, or other power drives configured to move one or more components of engraving machine 10 as discussed above. Thus, for example, as illustrated in FIG. 9, actuator 202 may include motor 204 and gear 206 rotatably connected to motor 204. Gear 206 may include a plurality of teeth 208 configured to engage with corresponding teeth (not shown) on outer surface 210 of ring 192. Rotation of motor 204 may cause gear 206 to rotate, which in turn may cause rotation of ring 192.

Item ejector 212 may be positioned outside of ring 192. In one exemplary embodiment, item ejector 212 may be positioned adjacent door 28 of housing 12 along a front-to-rear direction (e.g. Y-direction) of housing 12. Motor 204 may be configured to rotate ring 192 such that one of the magazines 196, 198, 200 may be positioned adjacent item ejector 212. Item ejector 212 may be configured to eject (e.g. push out) one onboard item 140 from a magazine (196, 198, 200) positioned adjacent item ejector 212 to allow gripper arms 138 to retrieve onboard item 140. Gripper arms 138 may be configured to clamp onto onboard item 140 and extract onboard item 140 from magazine 196, 198, or 200. Onboard storage 64 may also include chute 214 configured to dispense onboard item 140 to dispensing bin 22. For example, gripper arms 138 may be configured to open and release an engraved onboard item 140 into chute 214 allowing the engraved onboard item 140 to be dispensed to dispensing bin 22.

Figure 10:
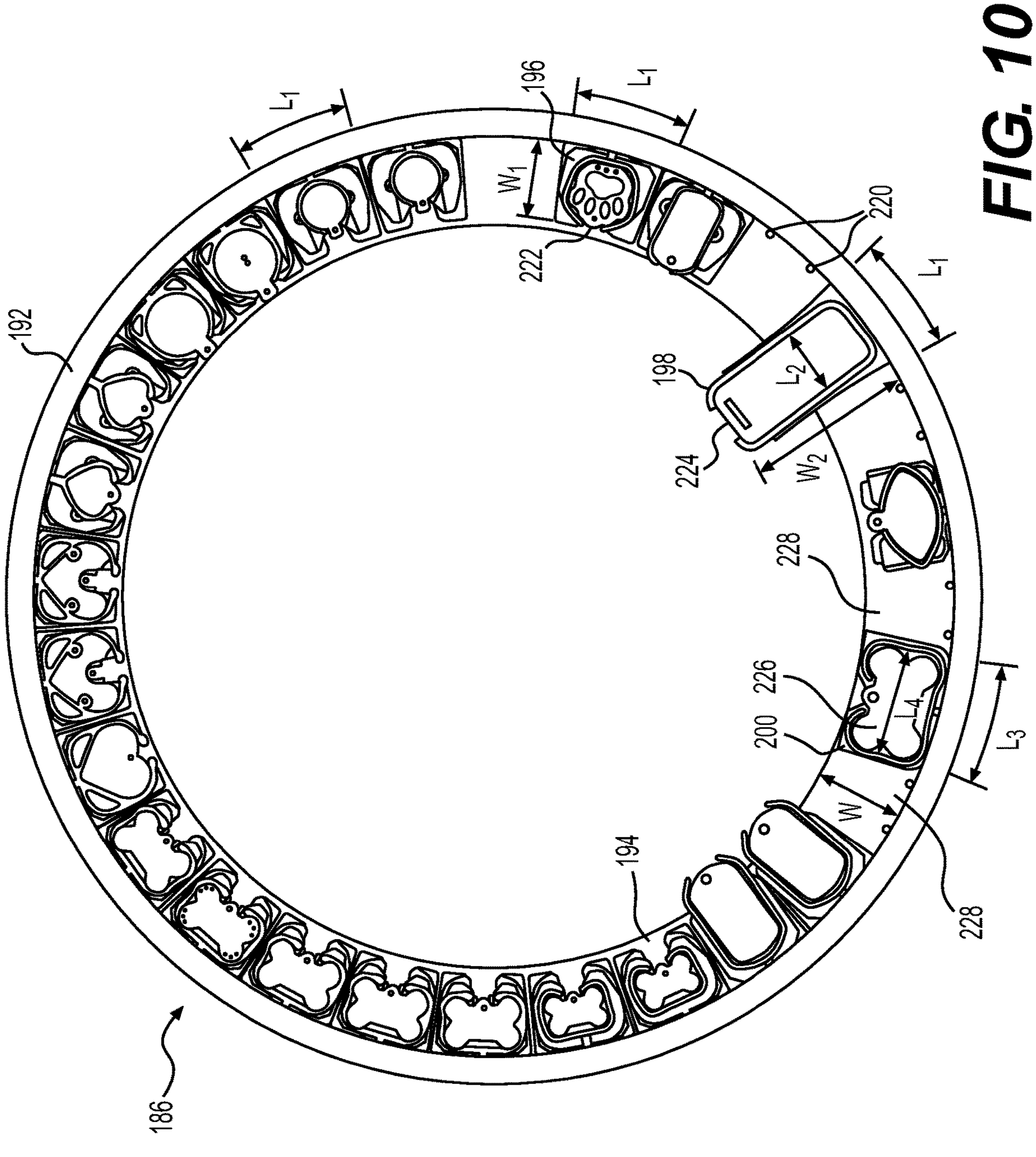
FIG. 10 is another illustration of the exemplary onboard storage of FIG. 9.

FIG. 10 illustrates a top view of carousel 186. As illustrated in FIG. 10, ring 192 may have a plurality of mounting locations 220 disposed circumferentially around ring 192. Mounting locations 220 may be uniformly spaced from each other. Thus, for example, a single mounting location 220 or a pair of adjacent mounting locations 220 may be configured to attach magazines 196, 198, 200 to ring 192. Magazine 196 may have a radial width $W_1$ that may be less than or about equal to width W of shelf 194. Magazine 196 may also have a circumferential length $L_1$ such that magazine 196 may be attachable to shelf 194 at a pair of adjacent mounting locations 220. In one exemplary embodiment as illustrated in FIG. 10, magazine 196 may be configured to store regular tags 222 that may have a length and width about equal to or lower than radial width $W_1$ and circumferential length $L_1$ of magazine 196.

Like magazine 196, magazine 198 may have a circumferential length $L_1$. However, magazine 198 may have a radial width $W_2$ that may be greater than width W of shelf 194. Magazine 198 may also have a circumferential width $L_1$ such that magazine 198 may be attachable to shelf 194 at a pair of adjacent mounting locations 220. In one exemplary embodiment as illustrated in FIG. 10, magazine 198 may be configured to store elongated tags 224. Elongated tags may have a radial extent that may be greater than width W of shelf 194 and circumferential length $L_2$ that may be less than or equal to circumferential length $L_1$ of magazine 198.

Magazine 200 may have a radial width that may be less than or about equal to width W of shelf 194. Magazine 200 may have a circumferential length $L_3$ that may be greater than circumferential lengths $L_1$ of magazines 196, 198. In one exemplary embodiment as illustrated in FIG. 10, magazine 200 may be configured to store oversized tags 226. Oversized tags 226 may have a radial extent that may be equal to or greater than width W of shelf 194 and a circumferential length $L_4$ that may be less than or equal to circumferential length $L_3$ of magazine 200, but may be larger than circumferential length $L_1$ of magazines 196, 198. As illustrated in FIG. 10, because of its large circumferential length $L_3$, magazine 200 may overlap with more than two mounting locations 220 and may be attached to shelf 194 at one mounting location 220. Moreover, because of the large circumferential extent of magazine 200, it may not be possible to attach other magazines (e.g. 196 or 198) on either side of magazine 200, leaving open spaces 228 on either side of magazine 200.

Figure 11B:
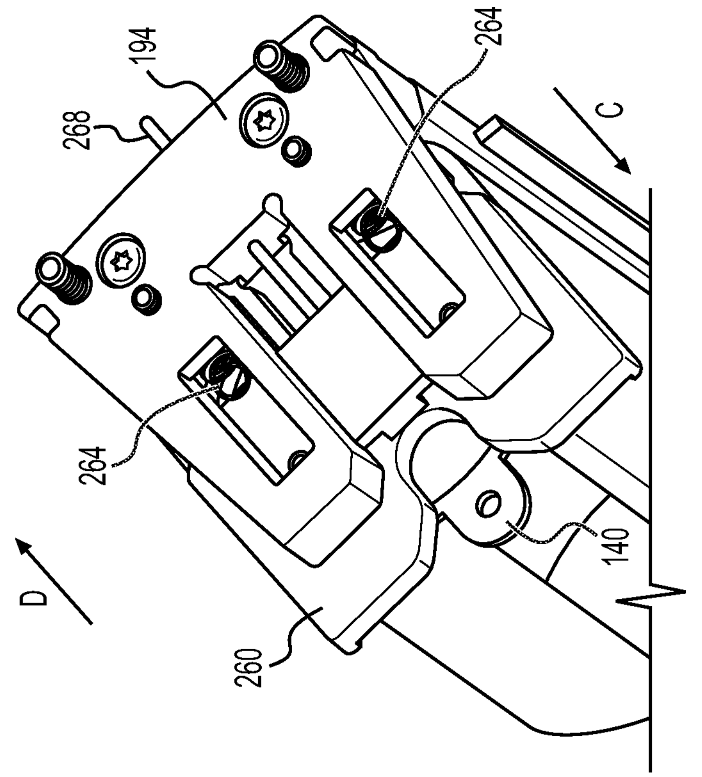
FIG. 11B is a bottom view illustration of a portion of the exemplary magazine of FIG. 11A.
Figure 11A:
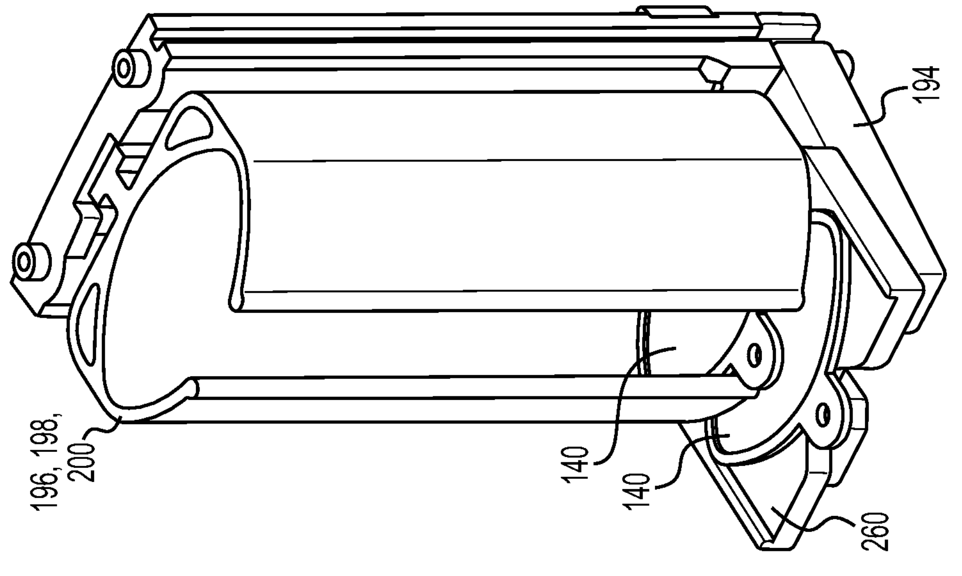
FIG. 11A is an illustration of an exemplary magazine for the onboard storage of FIG. 9.

FIG. 11A illustrates an exemplary magazine 196, 198, 200, which may include one or more onboard items 140 (e.g. onboard tags 140). As illustrated in FIG. 11A, magazine 196, 198, or 200 may include shuttle plate 260, which may be disposed at a bottom of magazine 196, 198, or 200 between magazine 196, 198, 200 and shelf 194. Shuttle plate 260 may be configured to be movable in a radial direction toward (C direction) or away from (D direction) a center of carousel 186. Shuttle plate 260 may be configured to receive one onboard item 140 located at a bottom of magazine 196, 198, 200. Item ejector 212 may include an actuator 268 configured to engage with and push shuttle plate 260 radially inwards towards a center of carousel 186 (e.g. in the C direction). In one exemplary embodiment as illustrated in FIG. 11B, actuator 268 may be a linear rod like member that may be connected to or may contact shuttle plate 260. When shuttle plate 260 is pushed radially inward, shuttle plate 260 may include the one onboard item 140. Pick mechanism 62 may be configured to clamp on to the one onboard item 140 in shuttle plate 260. Pick mechanism 62 may also be configured to extract the one onboard item 140 from shuttle plate 260.

FIG. 11B illustrates a bottom view of shuttle plate 260. As illustrated in FIG. 11B, one or more biasing members 264 may be disposed between shuttle plate 260 and ring 192 or shelf 194. Biasing members 264 may be configured to cause shuttle plate 260 to be retracted or pushed outward toward ring 192 (e.g. in the D direction). In one exemplary embodiment as illustrated in FIG. 11B, biasing members 264 may include springs, although other types of biasing members are also contemplated (e.g. spring loaded actuators). In some exemplary embodiments, actuator 268 of item ejector 212 may be configured to push shuttle plate 260 both in the radially inward (C direction) and outward (D direction) directions. Thus, in one exemplary embodiment, once pick mechanism 62 has extracted onboard item 140 from shuttle plate 260, controller 70 may signal item ejector 212 to withdraw actuator 268. Withdrawal of actuator 268 may allow biasing members 264 to cause shuttle plate 260 to move radially outward (e.g. in the D direction) away from a center of carousel 186 and towards ring 192. Thus, radial movement of shuttle plate 260 may help extract onboard item 140 from magazine 196, 198, or 200 and allow pick mechanism 62 to receive the extracted onboard item 140.

Figure 12:
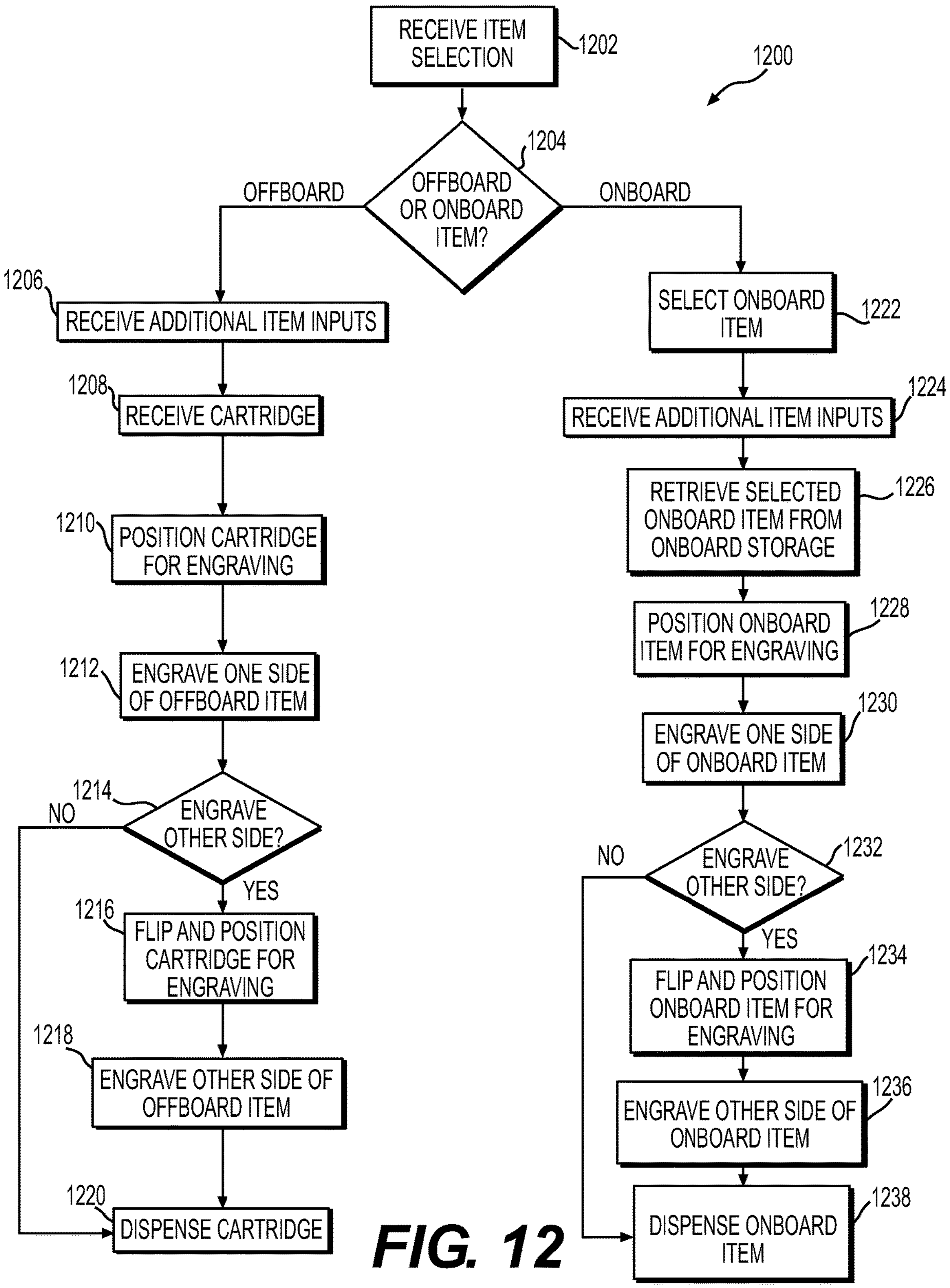
FIG. 12 is a flow chart of an exemplary method performed by the engraving machine of FIG. 1.

FIG. 12 illustrates an exemplary method 1200 of an engraving operation that may be performed by engraving machine 10. The order and arrangement of steps of method 1200 is provided for purposes of illustration. As will be appreciated from this disclosure, modifications may be made to method 1200 by, for example, adding, combining, removing, and/or rearranging the steps of method 1200. Method 1200 may be executed by controller 70 together with various other components of engraving machine 10.

Method 1200 may include a step of receiving item selection from a user (Step 1202). In operation, a user (e.g. customer) may initiate an interaction with engraving machine 10 by, for example, pressing a "start" button displayed on, for example, a touch-screen display 26, or by touching the touch-screen display 26. Display 26 may send a signal to controller 70 indicating pressing of the "start button" or detection of a touch on display 26. In response, controller 70 may provide additional instructions to the user via display 26. For example, controller 70 may display a text message "Would you like to engrave a tag?" on display 26. Controller 70 may also display, for example, buttons or check boxes with the text "Yes" or "No." Controller 70 may receive a response from the user via the touchscreen display 26 or via one or more input devices 24 associated with engraving machine 10. When controller 70 determines that the user wishes to engrave a tag based on the received inputs, controller 70 may display a text message "Did you already purchase a cassette tag, or would you like to buy an onboard tag?" Controller 70 may receive a selection of the cassette tag (e.g. offboard item 42) or onboard tag (e.g. onboard item 140) from the user via the touchscreen display 26 or via one or more input devices 24 associated with engraving machine 10. Controller 70 may monitor one or both of input devices 24 and/or touchscreen display 26 to receive a signal indicating a user selection of one of offboard item 42 or onboard item 140.

Method 1200 may include a step of determining whether the user has selected offboard item 42 or onboard item 140 (Step 1204). When controller 70 determines that the user has selected offboard item 42 (Step 1204: Offboard), controller 70 may control one or more actuators associated with pick mechanism 62 to position movable platform 122 adjacent to onboard storage 64 and below carrier assembly 82. Controller 70 may then proceed to step 1206. When controller 70 determines, however, that the user has selected onboard item 140 (Step 1204: Onboard), controller 70 may control actuator 94 to move table 84 and carrier 86 toward slot 20 such that carrier 86 is positioned adjacent to slot 20. Controller 70 may then proceed to step 1222.

In step 1206, controller 70 may receive additional inputs from the user. For example, Controller 70 may display instructions on display 26, requesting the user to indicate whether the user wants to engrave one side or both sides of offboard item 42. Controller 70 may also display instructions on display 26, requesting the user to enter a desired inscription for one or both sides of offboard item 42 based on the user selection. Controller 70 may receive the one or more user inputs and/or selections via the one or more input devices 24 and/or via touchscreen display 26. After receiving the user selections and inputs, controller 70 may display a price on display 26, and request the user to make payment using either cash acceptor 14 and/or payment capture device 16. Controller 70 may monitor signals from cash acceptor 14 and/or payment capture device 16 to determine whether the required amount of money has been paid. When controller 70 determines that adequate amount of payment has been made, controller 70 may proceed to step 1208.

In step 1208, controller 70 may display instructions on display 26, requesting the user to insert cartridge 40 including offboard item 42 into slot 20. Controller 70 may control actuator 94 to move table 84 of carrier assembly 82 towards slot 20 such that carrier 86 may be positioned adjacent to slot 20 and such that slot 100 of carrier 86 may be aligned with slot 20 so that cartridge 40 may be received by carrier 86. Controller 70 may monitor one or more sensors associated with cartridge 40 and/or slot 20 to determine whether cartridge 40 has been inserted into slot 20.

Method 1200 may include a step of positioning cartridge 40 for engraving (Step 1210). Controller 70 may control actuator 94 to move table 84 away from slot 20 such that carrier 86 may be located in a first engraving position. In the first engraving position, carrier 86 may be positioned on and supported by rollers 110 attached to carrier block 90. such that windows 102 may be positioned on recess 108 of carrier block 90.

Method 1200 may include a step of engraving one side of offboard item 42 (Step 1212). In step 1212 controller 70 may control one or more actuators 78 associated with engraver 76 to position engraver 76 above window 102 of carrier 86. Controller 70 may also control one or more actuators 78 associated with engraver 76 to move engraver 76 such that engraver 76 may engrave the inscription provided by the user, for example, in step 1206 on to the side of offboard item 42 facing engraver 76. Controller 70 may monitor engraver 76 and/or one or more other sensors associated with engraver 76 to determine whether engraver 76 has finished engraving the side of offboard item 42 facing engraver 76.

Method 1200 may include a step of determining whether it is required to engrave the other side of offboard item 42 (Step 1214). Controller 70 may make this determination based on inputs received from the user, for example, in step 1206. When controller 70 determines that the user desires to engrave the other side of offboard item 42 (Step 1214: Yes), controller 70 may proceed to step 1216. When controller 70 determines, however, that the user does not desire to engrave the other side of offboard item 42 (Step 1214: No), controller 70 may proceed to step 1220.

In step 1216, controller 70 may control actuator 94 to move table 84 in a direction away from carrier block 90 such that carrier 86 is free and clear of carrier block 90. For example, Controller 70 may cause table 84 to move in the Y-direction until carrier 86 is spaced apart from carrier block 90. Controller 70 may send signals to actuator 98 to rotate carrier 86 via belt 114 such that carrier 86 is flipped over, allowing the other, unengraved side of offboard item 42 to face engraver 76. Controller 70 may then send signals to actuator 94 to move table 84 and carrier 86 towards slot 20, positioning carrier 86 in the first engraving position on rollers 110 of carrier block 90 such that the other, unengraved side of offboard item 42 is exposed via window 102. Method 1200 may include a step of engraving the other side of offboard item 42 (Step 1218). In step 1218, controller 70 may execute processes similar to those discussed above, for example, in step 1212 to engrave the other side of offboard item 42.

Method 1200 may include a step of dispensing cartridge 40 (Step 1220). In step 1220, controller 70 may control actuator 94 to move table 84 toward slot 20 so that carrier 86 is positioned adjacent slot 20 and slot 100 of carrier 86 is aligned with slot 20. Controller 70 may also control one or more ejector mechanisms associated with carrier 86 to eject cartridge 40 from carrier 86 through slot 20 for the user to retrieve cartridge 40.

Returning to step 1204, when controller 70 determines that the user has selected onboard item 140 (Step 1204: Onboard), controller 70 may proceed to step 1222 of selecting an onboard item 140 from onboard storage 64. In step 1222, controller 70 may display instructions on display 26, requesting the user to select an onboard item 140 for engraving from one of the plurality of onboard items 140 stored in onboard storage 64. Controller 70 may display images of the onboard items 140 or text describing the onboard items 140 stored in onboard storage 64. Controller 70 may receive selection of an onboard item 140 by the user via one or more of input devices 24 and/or touchscreen display 26.

Method 1200 may include a step of receiving additional inputs (Step 1224). In step 1224, controller 70 may receive user inputs indicating whether the user desires to engrave one or both sides of onboard item 140, user-specified inscriptions for one or both sides of onboard item 140, and payment for engraving onboard item 140. Controller 70 may execute processes similar to those discussed above for example, with respect to step 1206 to receive these above-described additional inputs.

Method 1200 may include a step of retrieving a selected onboard item 140 from onboard storage 64 (Step 1281226). In step 1281226, controller 70 may control motor 204 to rotate ring 192 of carousel 186 such that a magazine 196, 198, or 200 containing the user-selected onboard item 140 is positioned adjacent item ejector 212. For example, when the user selects a tag shaped in the form of the paw of a pet (see e.g. magazine 196, FIG. 10), controller 70 may control motor 204 to rotate ring 192 such that magazine 196 is positioned adjacent item ejector 212. Controller 70 may also control item ejector 212 to eject one onboard item 140 (e.g. regular tag 222) from magazine 196. Further, controller 70 may control one or more actuators 150, 152, 154 associated with pick mechanism 62 so that movable platform 122 is positioned adjacent onboard storage 64. Controller 70 may control actuator 150 to cause gripper arms 138 to move apart from each other. Controller 70 may also control actuator 150 to move gripper assembly towards onboard item 140 ejected by item ejector 212 to position gripper arms 138 adjacent onboard item 140. Controller 70 may then control actuator 150 to cause gripper arms 138 to move towards each other, engaging upper and lower surfaces 142, 144 of onboard item 140 and clamping on to onboard item 140 ejected by item ejector 212. Controller 70 may then control actuator 154 to move gripper assembly 130 away from item ejector 212, retrieving the selected onboard item 140 from, for example, magazine 196.

Method 1200 may include a step of positioning onboard item 140 in a second engraving position (Step 1228). In step 1228, controller 70 may control one or more actuators associated with pick mechanism 62 to cause movable platform 122 to move in a generally vertical direction from adjacent onboard storage 64 toward engraver 76. Controller 70 may be configured to control the one or more actuators to stop a vertical movement of movable platform 122, when docking pins 118 on plate 88 of carrier assembly 82 engage with and are received in openings 240 of receptacles 236 on movable platform 122. Controller 70 may also control actuator 154 to move gripper assembly toward anvil 134 so that onboard item 140 grasped by gripper arms 138 is positioned and supported by upper surface 184 of anvil 134. Further controller 70 may control actuators 158 to move jaws 156 towards each other such that groove 172 may engage one or both of edges 146 of onboard item 140 to horizontally clamp onboard item 140.

Method 1200 may include a step of engraving one side of onboard item 140 (Step 1230). In step 1230, controller 70 may control one or more actuators 78 associated with engraver 76 to move engraver 76 adjacent to the one side (e.g. upper surface 142 or lower surface 144) of onboard item 140 facing engraver 76. Controller 70 may execute operations similar to those discussed above with respect to, for example, step 1212. Method 1200 may include a step of determining whether to engrave the opposite side of onboard item 140 (Step 1232). Controller 70 may make this determination based on inputs received from the user, for example, in step 1224. When controller 70 determines that the user desires to engrave the other side of onboard item 140 (Step 1232: Yes), controller 70 may proceed to step 1234. When controller 70 determines, however, that the user does not desire to engrave the other side of onboard item 140 (Step 1232: No), controller 70 may proceed to step 1238.

Method 1200 may include a step of flipping and positioning onboard item and 44 engraving an opposite side of onboard item 140 (Step 1234). In step 1234, controller 70 may control actuator 154 to move gripper assembly 130 in a direction (e.g. Y-direction) away from anvil 134 until onboard item 140 is spaced apart from anvil 134. Controller 70 may send signals to actuator 150 to rotate gripper arms 138 by, for example, about 180° such that onboard item 140 is flipped over, allowing an opposite, unengraved side of onboard item 140 to face engraver 76. For example, when upper surface 142 is engraved in step 1230, lower surface 144 may be positioned facing engraver 76 in step 1234 and vice-versa. Controller 70 may then send signals to actuator 154 to move gripper assembly 130 towards anvil 134, positioning onboard item 140 on upper surfaces 184 of anvil 134 such that the other, unengraved side of onboard item 140 faces engraver 76. Method 1200 may include a step of engraving the other side of onboard item 140 (Step 1236). In step 1236, controller 70 may execute processes similar to those discussed above, for example, in step 1230 to engrave the other side of onboard item 140.

Method 1200 may include a step of dispensing onboard item 140 (Step 1238). In step 1238, controller 70 may control actuator 154 to move gripper assembly 130 in a direction away from anvil 134. Controller 70 may also control one or more actuators associated with pick mechanism 62 to move movable platform 122 in the second direction (e.g. −Z direction) from adjacent engraver 76 to adjacent onboard storage 64. Controller 70 may then control actuator 154 to move gripper assembly 130 in the first direction (e.g. −Y direction) so that gripper arms 138 grasping onboard item 140 are positioned adjacent to chute 214. Controller 70 may also control actuator 150 to cause gripper arms 138 to move apart from each other to their open position, releasing onboard item 140 into chute 214. Onboard item 140 may travel from chute 214 into dispensing bin 22, allowing the user to retrieve the engraved onboard item 140 from dispensing bin 22.

The disclosed engraving machine 10 and method 1200 may provide several advantages. For example, the disclosed engraving machine 10 and method 1200 may help automate the complicated task of engraving both offboard items 42 and onboard items 140, while enhancing safety, convenience, and speed. By enabling engraving of both offboard items 42 or onboard items 140, the disclosed engraving machine 10 may help improve customer convenience, while providing a self-service engraving experience to a customer, without any assistance required from a store clerk or otherwise trained or professional human operator. Furthermore, by using the above-described onboard storage 64, that permits attachment of a plurality of magazines having different circumferential widths, the disclosed engraving machine 10 may help to store and provide a significantly larger number and/or variety of onboard items 140 to the user than possible in conventional engraving machines.

It will be apparent to those skilled in the art that various modifications and variations can be made to the disclosed engraving machine. Other embodiments will be apparent to those skilled in the art from consideration of the specification and practice of the disclosed engraving machine. It is intended that the specification and examples be considered as exemplary only, with a true scope being indicated by the following claims and their equivalents.

What is claimed is:

1. An engraving machine, comprising:
- a housing;
- an engraver located within the housing;
- a slot disposed on the housing and configured to receive a cartridge including an offboard item to be engraved;
- an onboard storage configured to store a plurality of tags;
- a carrier configured to receive the cartridge through the slot and to position the cartridge relative to the engraver; and
- a pick mechanism configured to selectively retrieve a tag from the tags stored in the onboard storage and position the tag relative to the engraver,
  - wherein the engraver is configured to engrave a selected one of the offboard item or the tag.

2. The engraving machine of claim 1, wherein
- the carrier is configured to move toward or away from the slot in a first direction, and
- the pick mechanism includes a movable platform configured to move toward or away from the onboard storage in a second direction generally perpendicular to the first direction.

3. The engraving machine of claim 2, wherein the pick mechanism includes a pair of gripper arms configured to be movable relative to each other, the gripper arms being configured to engage with opposing surfaces of the tag.

4. The engraving machine of claim 3, wherein, the pick mechanism further includes an actuator configured to:
- position the tag such that an upper surface of the tag faces the engraver; and
- rotate the gripper arms to flip the tag such that a lower surface of the tag faces the engraver.

5. The engraving machine of claim 4, wherein the pick mechanism includes a horizontal clamp configured to engage with an edge of the tag.

6. The engraving machine of claim 5, wherein the horizontal clamp includes a pair of jaws movable relative to each other in a third direction that is generally perpendicular to both the first direction and the second direction.

7. The engraving machine of claim 6, wherein at least one of the jaws includes a generally V-shaped groove configured to engage with the edge of the tag.

8. The engraving machine of claim 7, wherein the pick mechanism includes an anvil positioned between the jaws, the anvil configured to support one of one of a pair of opposing surfaces of the tag.

9. The engraving machine of claim 2, further including:
- a carrier assembly, including:
  - a fixed plate;
  - at least one docking pin attached to the fixed plate; and
  - a movable plate configured to move the carrier toward or away from the slot in the first direction, and
  - a receptacle attached to the movable platform, the receptacle including an opening configured to receive the at least one docking pin.

10. The engraving machine of claim 1, wherein the onboard storage includes:
- at least one first magazine configured to store a first plurality of tags having a first circumferential length; and
- at least one second magazine configured to store a second plurality of tags having a second circumferential length different from the first circumferential length.

11. The engraving machine of claim 1, wherein the onboard storage includes a carousel including:
- a ring rotatable about a generally vertical axis; and
- a plurality of magazines arranged circumferentially around the ring.

12. The engraving machine of claim 11, wherein the ring includes a plurality of circumferentially spaced mounting locations for removably attaching the magazines to the ring.

13. The engraving machine of claim 1, further including a controller configured to:
- receive selection of one of the offboard item or the tag for engraving;
- selectively position the carrier at a first engraving location, when the selection includes the offboard item;
- selectively position the pick mechanism at a second engraving location, when the selection include the tag; and
- position the engraver adjacent to one of the first engraving location or the second engraving location based on the received selection.

14. The engraving machine of claim 1, wherein the engraver is one of a scratch engraver, a laser engraver, or a milling engraver.

15. An engraving machine, comprising:
- a housing;
- an input device associated with the housing;

an engraver located within the housing;

a slot disposed on the housing and configured to receive a cartridge including an offboard item to be engraved;

a carrier configured to receive the cartridge through the slot and to position the cartridge relative to the engraver;

an onboard storage configured to store a plurality of tags;

a pick mechanism configured to selectively retrieve a tag from the tags stored in the onboard storage and to position the tag relative to the engraver;

a chute configured to dispense the tag; and a controller, configured to:

receive, from the input device, a user selection of one of the offboard item or the tag for engraving; and selectively control one or more of the carrier, the pick mechanism, or the engraver to engrave one of the offboard item or the tag based on the user selection.

16. The engraving machine of claim 15, wherein when the user selection includes the tag, the controller is configured to:

control the pick mechanism to retrieve the tag from the onboard storage and position the tag at a first engraving position;

position the engraver adjacent to the first engraving position;

control the engraver to engrave a user-selected inscription on the tag; and cause the pick mechanism to dispense the engraved tag in the chute.

17. The engraving machine of claim 16, further including an item ejector positioned adjacent the onboard storage, and wherein the onboard storage includes a carousel including a magazine.

18. The engraving machine of claim 17, wherein the controller is further configured to:

selectively rotate the carousel such that the magazine including the tag selected by a user is positioned adjacent the item ejector;

control the item ejector to push out the tag from the magazine; and adjust the pick mechanism to grasp the tag pushed out by the item ejector.

19. The engraving machine of claim 15, wherein when the user selection includes the offboard item, the controller is configured to:

move the carrier to a position adjacent the slot;

receive, in the carrier, the cartridge inserted into the slot;

move the carrier to a second engraving position spaced apart from the slot;

position the engraver adjacent to the second engraving position;

control the engraver to engrave a user-selected inscription on the offboard item;

return the cartridge to the position adjacent the slot; and control the cartridge to dispense the cartridge through the slot.

20. The engraving machine of claim 15, wherein the plurality of tags includes one or more of a football tag, a luggage tag, a military tag, a heart tag, an elongated tag, or an oversized tag.

21. An engraving machine, comprising:

a housing;

an engraver located within the housing;

a circular carousel configured to store a plurality of tags in one or more magazines configured to eject a tag in a radially inward direction towards a center of the carousel; and a pick mechanism configured to selectively retrieve the tag ejected from the carousel and position the tag relative to the engraver, wherein the engraver is configured to engrave the tag.

22. The engraving machine of claim 21 configured to dispense an accessory with the tag.

23. The engraving machine of claim 21 configured to dispense a split ring with the tag.

24. The engraving machine of claim 21, further including:

a touch screen configured to receive a user input associated with an inscription for engraving on the tag.

25. The engraving machine of claim 21, wherein the pick mechanism is configured to grasp the tag to retrieve the tag from the tags stored in the carousel.

26. The engraving machine of claim 21, wherein the carousel includes an ejector configured to eject the tag.

* * * * *